(12) United States Patent
Sharifi et al.

(10) Patent No.: US 12,437,761 B2
(45) Date of Patent: *Oct. 7, 2025

(54) GROUP HOTWORDS

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/535,701

(22) Filed: Dec. 11, 2023

(65) Prior Publication Data

US 2024/0105178 A1 Mar. 28, 2024

Related U.S. Application Data

(63) Continuation of application No. 17/118,687, filed on Dec. 11, 2020, now Pat. No. 11,862,155.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/02* (2013.01); *G10L 15/08* (2013.01);
(Continued)

(58) Field of Classification Search
CPC ......... G10L 15/22; G10L 15/02; G10L 15/08; G10L 17/24; G10L 2015/088; G10L 2015/223; G06F 3/167
See application file for complete search history.

(56) References Cited

U.S. PATENT DOCUMENTS 9,984,686 B1   5/2018  Mutagi et al.
10,586,540 B1  3/2020  Smith et al.
(Continued)

FOREIGN PATENT DOCUMENTS

CN    110457078 A    11/2019
EP     1207516 A1     5/2002
(Continued)

OTHER PUBLICATIONS

International Search Report and Written Opinion relating to PCT/US2021/062707, dated Mar. 30, 2022.
(Continued)

*Primary Examiner* — Mark Villena
(74) *Attorney, Agent, or Firm* — Honigman LLP; Brett A. Krueger; Grant Griffith

(57) ABSTRACT

A method includes a first assistant-enabled device (AED) receiving an assignment instruction assigning a group hotword to a selected group of AEDs that includes the first AED and one or more other AEDs. Each AED is configured to wake-up from a low-power state when the group hotword is detected in streaming audio by at least one of the AEDs. The method also includes receiving audio data that corresponds to an utterance spoken by the user and includes a query that specifies an operation to perform. In response to detecting the group hotword in the audio data, the method also includes triggering the first AED to wake-up from the low-power state and executing a collaboration routine to cause the first AED and each other AED in the selected group of AEDs to collaborate with one another to fulfill performance of the operation specified by the query.

20 Claims, 10 Drawing Sheets

(51) Int. Cl.
*G10L 15/02* (2006.01)
*G10L 15/08* (2006.01)
*G10L 17/24* (2013.01)

(52) U.S. Cl.
CPC ........ *G10L 17/24* (2013.01); *G10L 2015/088* (2013.01); *G10L 2015/223* (2013.01)

(56) References Cited

U.S. PATENT DOCUMENTS

| | | | |
|---|---|---|---|
| 10,616,726 B1* | 4/2020 | Freeman, II | H04W 8/02 |
| 10,971,158 B1* | 4/2021 | Patangay | H04L 67/10 |
| 2017/0025124 A1* | 1/2017 | Mixter | G10L 15/32 |
| 2017/0345422 A1 | 11/2017 | Yang | |
| 2018/0061419 A1* | 3/2018 | Melendo Casado | G10L 25/78 |
| 2018/0277107 A1 | 9/2018 | Kim | |
| 2019/0027138 A1 | 1/2019 | Wang et al. | |
| 2019/0304439 A1 | 10/2019 | Mese et al. | |
| 2019/0311720 A1* | 10/2019 | Pasko | G10L 25/60 |
| 2020/0031231 A1 | 1/2020 | Vogt | |
| 2020/0040744 A1 | 2/2020 | Bornard et al. | |
| 2020/0194004 A1 | 6/2020 | Bates | |
| 2020/0312318 A1* | 10/2020 | Olson | G06F 3/167 |
| 2021/0174794 A1* | 6/2021 | Mont-Reynaud | G10L 15/08 |
| 2022/0270601 A1* | 8/2022 | Hines | G10L 15/22 |

FOREIGN PATENT DOCUMENTS

| | | |
|---|---|---|
| JP | 2001-197379 A | 7/2001 |
| JP | 2018-159918 A | 10/2018 |
| WO | 2020040744 A1 | 2/2020 |

OTHER PUBLICATIONS

USPTO. Office Action relating to U.S. Appl. No. 17/118,687, dated Mar. 16, 2023.

S. Milivojša et al. "Implementation of voice control interface for smart home automation system," 2017 IEEE 7th International Conference on Consumer Electronics—Berlin (ICCE—Berlin), Berlin, Germany, 2017, pp. 263-264, doi: 10.1109/ICCE-Berlin.2017.8210646.

Office Action issued in corresponding Japanese Patent Application No. 2023-535574, dated Sep. 30, 2024.

* cited by examiner

Hotword Registry

| Device | Default Hotword | Manual Hotword | Implicit Hotwords | Action-Specific Hotword |
|---|---|---|---|---|
| Speaker 1 | Hey Assistant | Family Room Devices | Nearby Device(s), Smart Speakers, Blue Speakers | Music Videos |
| Speaker 2 | Hey Assistant, Other Assistant | Family Room Devices | Nearby Device(s), Smart Speakers, Blue Speakers | |
| Speaker 3 | Hey Assistant | Family Room Devices | Nearby Device(s), Smart Speakers, Red Speakers | |
| Speaker 4 | Hey Assistant | Family Room Devices | Nearby Device(s), Smart Speakers, Red Speakers | |
| Speaker 5 | Hey Assistant | Kitchen Devices | Nearby Device(s), Smart Speakers | |
| Speaker 6 | Hey Assistant | Bedroom Speakers | Nearby Device(s), Smart Speakers | |
| Speaker 7 | Hey Assistant | Bedroom Speakers | Nearby Device(s), Smart Speakers | |
| Smart Display | Hey Assistant, Other Assistant | Kitchen Devices | Nearby Device(s), Smart Displays | |
| Smart TV | Hey Assistant | Family Room Devices | Nearby Device(s), Smart Displays | Music Videos |
| Smart Phone | Hey Assistant, Other Assistant | | Nearby Device(s) | |

GROUP HOTWORDS

CROSS-REFERENCE TO RELATED APPLICATIONS

This U.S. patent application is a continuation of, and claims priority under 35 U.S.C. § 120 from, U.S. patent application Ser. No. 17/118,687, filed on Dec. 11, 2020. The disclosure of this prior application is considered part of the disclosure of this application and is hereby incorporated by reference in its entirety.

TECHNICAL FIELD

This disclosure relates to group hotwords.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Once awake, the devices can proceed to perform more expensive processing such as full on-device automated speech recognition (ASR) or server-based ASR.

SUMMARY

One aspect of the disclosure provides a method for enabling and assigning a group hotword to a selected group of two or more assistant-enabled devices. The method includes receiving, at data processing hardware of first assistant-enabled device (AED), an assignment instruction assigning a group hotword to a selected group of AEDs associated with a user. The selected group of AEDs includes the first AED and one or more other AEDs. Each AED in the selected group of AEDs is configured to wake-up from a low-power state when the group hotword is detected in streaming audio by at least one of the AEDs in the selected group of AEDs. The method also includes receiving, at the data processing hardware, audio data that corresponds to an utterance spoken by the user and includes a query that specifies an operation to perform. In response to detecting the group hotword in the audio data, the method includes triggering, by the data processing hardware, the first AED to wake-up from the low-power state. The method also includes executing, by the data processing hardware, a collaboration routine to cause the first AED and each other AED in the selected group of AEDs to collaborate with one another to fulfill performance of the operation specified by the query.

Implementations of the disclosure may include one or more of the following optional features. In some implementations, the method further includes executing, by the data processing hardware, a leader election process to elect, based on respective device properties associated with each AED in the selected group of AEDs, one or more AEDs from the selected group of AEDs to listen for the presence of the group hotword in the streaming audio on behalf of the selected group of AEDs. Here, at least the first AED in the selected group of AEDs is elected by the leader election process to listen for the presence of the group hotword in the streaming audio. In these implementations, the method may also include, re-executing, by the data processing hardware, the leader election process in response to at least one of: an update to the selected group of AEDs assigned the group hotword that adds one or more additional AEDs to the selected group of AEDs and/or removes one or more of the AEDs from the selected group of AEDS; or an occurrence of a device state change at one of the AEDs in the selected group of AEDs. Optionally, the respective device properties associated with each AED in the selected group of AEDs may include at least one of processing capabilities, device type, user-configurable device settings, power usage, battery level, physical location of the AED, or network capabilities.

In response to detecting the group hotword in the audio data, the method may further include invoking, by the data processing hardware, each other AED in the selected group of AEDs that did not detect the group hotword in the audio data to wake-up from the low-power state and collaborate with all the AEDs in the selected group of AEDs to fulfill performance of the operation specified by the query. In some implementations, in response to detecting the group hotword in the audio data, the method further includes identifying, by the data processing hardware, each of the one or more other AEDs in the selected group of AEDs assigned the group hotword by accessing a hotword registry. The hotword registry contains a list of one or more hotwords each assigned to one or more AEDs associated with the user (or a group of users) and the list of one or more hotwords includes the group hotword. In these implementations, invoking each other AED in the selected group of AEDs is based on each of the one or more other AEDs assigned the group hotword identified by accessing the hotword registry. In some examples, the hotword registry is stored on at least one of the first AED, at least one other AED associated with the user, or a server in communication with the first AED.

Optionally, receiving the assignment instruction that assigns the group hotword to the selected group of AEDs may include receiving a voice input form the user requesting a digital assistant to enable the group hotword and assign the group hotword to the selected group of AEDs, instructing a speech recognizer to perform speech recognition on the audio data to generate an automated speech recognition (ASR) result for the voice input, and performing query interpretation on the ASR result for the voice input to identify a group hotword that specifies a name of the group hotword to enable each AED in the selected group of AEDs to be assigned the group hotword. In some implementations, receiving the assignment instruction that assigns the group hotword to the selected group of AEDs includes receiving a user input indication that indicates a user interaction with one or more objects displayed in a graphical user interface to instruct a digital assistant to enable the group hotword and each AED in the selected group of AEDs to be assigned the group hotword.

The method may further include receiving, at the data processing hardware, prior audio data spoken by the user that corresponds to a command for a digital assistant to perform a long-standing action on two or more AEDs associated with the user. The digital assistant is configured to automatically create the group hotword for use in follow-up queries that pertain to the long-standing action. Here, receiving the assignment instruction that assigns the group hotword to the selected group of AEDs includes receiving the group hotword automatically created by the digital assistant. The selected group of AEDs assigned the group hotword include the two or more AEDs performing the long-standing action. In some implementations, the method further includes outputting, by the data processing hardware, for audible playback from the first AED, synthesized speech that corresponds to a response from the digital assistant to indicate performance of the long-standing action is in progress and the automatically created group hotword for use in follow-up queries that pertain to the long-standing action. In these implementations, the digital assistant revokes use of the automatically created group hotword when the long-standing action ends. In some examples, each AED in the selected group of AEDs is associated with a same device type or shares a common attribute, the group hotword assigned to the selected group of AEDs includes an implicit hotword that uniquely identifies the device type associated with the selected group of AEDs or the common attribute, and the hotword detection model is pre-trained to detect the presence of the group hotword in streaming audio without performing speech recognition on the audio data.

In some implementations, the group hotword assigned to the selected group of AEDs includes a proximity-based hotword that addresses only a subset of one or more AEDs from the selected group of AEDs that are currently closest in proximity to the user without explicitly identifying any particular AED in the subset of the one or more AEDs. The hotword detection model is pre-trained to detect the presence of the group hotword in streaming audio without performing speech recognition on the audio data and executing the collaboration routine causes the first AED and each other AED in the selected group of AEDs to each determine a respective proximity value relative to the user and perform arbitration using the respective proximity values across the selected group of AEDs to elect the subset of the one or more AEDs to fulfill performance of the operation specified by the query. Optionally, the group hotword may include one of a custom hotword created by the user or a predefined hotword selected from a list of one or more available group hotwords. During execution of the collaboration routine, the first AED and each other AED in the selected group of AEDs collaborate with one another by designating one of the AEDs in the selected group of AEDS to generate a speech recognition result for the audio data, perform query interpretation on the speech recognition result to determine that the speech recognition result identifies the query that specifies the operation to perform, and share the query interpretation performed on the speech recognition result with the other AEDs in the selected group of AEDs.

In some implementations, the query specifying the operation to perform includes a query for the selected group of AEDs to perform a long-standing operation and during execution by the collaboration routine, each AED in the selected group of AEDs collaborate with one another by pairing with one another for a duration of the long-standing operation and coordinating performance of sub-actions related to the long-standing operation. The operation specified by the query may include a device-level operation to perform on each AED in the selected group of AEDs and during execution of the collaboration routine, each AED in the selected group of AEDs collaborate with one another by fulfilling performance of the device-level operation independently.

Another aspect of the disclosure provides a first assistant-enabled device (AED) for enabling and assigning a group hotword to a selected group of two or more assistant-enabled devices. The first AED includes data processing hardware and memory hardware in communication with the data processing hardware. The memory hardware stores instructions that when executed on the data processing hardware cause the data processing hardware to perform operations. The operations include receiving an assignment instruction assigning a group hotword to a selected group of AEDs associated with a user. The selected group of AEDs includes the first AED and one or more other AEDs. Each AED in the selected group of AEDs is configured to wake-up from a low-power state when the group hotword is detected in streaming audio by at least one of the AEDs in the selected group of AEDs. The operations also include receiving audio data that corresponds to an utterance spoken by the user and includes a query that specifies an operation to perform. In response to detecting the group hotword in the audio data, the operations include triggering the first AED to wake-up from the low-power state. The operations also include executing a collaboration routine to cause the first AED and each other AED in the selected group of AEDs to collaborate with one another to fulfill performance of the operation specified by the query.

Implementations of the disclosure may include one or more of the following optional features. In some implementations, the operations further include executing a leader election process to elect, based on respective device properties associated with each AED in the selected group of AEDs, one or more AEDs from the selected group of AEDs to listen for the presence of the group hotword in the streaming audio on behalf of the selected group of AEDs. Here, at least the first AED in the selected group of AEDs is elected by the leader election process to listen for the presence of the group hotword in the streaming audio. In these implementations, the operations may also include, re-executing the leader election process in response to at least one of an update to the selected group of AEDs assigned the group hotword adds one or more additional AEDs to the selected group of AEDs and/or removes one or more of the AEDs from the selected group of AEDs or an occurrence of a device state change at one of the AEDs in the selected group of AEDs. Optionally, the respective device properties associated with each AED in the selected group of AEDs may include at least one of processing capabilities, device type, user-configurable device settings, power usage, battery level, physical location of the AED, or network capabilities.

In response to detecting the group hotword in the audio data, the operations may further include invoking each other AED in the selected group of AEDs that did not detect the group hotword in the audio data to wake-up from the low-power state and collaborate with all the AEDs in the selected group of AEDs to fulfill performance of the operation specified by the query. In some implementations, in response to detecting the group hotword in the audio data, the operations further include identifying each of the one or more other AEDs in the selected group of AEDs assigned the group hotword by accessing a hotword registry. The hotword registry contains a list of one or more hotwords each assigned to one or more AEDs associated with the user and the list of one or more hotwords includes the group hotword. In these implementations, invoking each other AED in the selected group of AEDs is based on each of the one or more other AEDs assigned the group hotword identified by accessing the hotword registry. In some examples, the hotword registry is stored on at least one of the first AED, at least one other AED associated with the user, or a server in communication with the first AED.

Optionally, receiving the assignment instruction that assigns the group hotword to the selected group of AEDs may include receiving a voice input form the user requesting a digital assistant to enable the group hotword and assign the group hotword to the selected group of AEDs, instructing a speech recognizer to perform speech recognition on the audio data to generate an automated speech recognition (ASR) result for the voice input, and performing query interpretation on the ASR result for the voice input to identify a group hotword that specifies a name of the group hotword to enable each AED in the selected group of AEDs to be assigned the group hotword. In some implementations, receiving the assignment instruction that assigns the group hotword to the selected group of AEDs includes receiving a user input indication that indicates a user interaction with one or more objects displayed in a graphical user interface to instruct a digital assistant to enable the group hotword and each AED in the selected group of AEDs to be assigned the group hotword.

In some examples, the operations further include receiving prior audio data spoken by the user that corresponds to a command for a digital assistant to perform a long-standing action on two or more AEDs associated with the user. The digital assistant is configured to automatically create the group hotword for use in follow-up queries that pertain to the long-standing action. Here, receiving the assignment instruction that assigns the group hotword to the selected group of AEDs includes receiving the group hotword automatically created by the digital assistant. The selected group of AEDs assigned the group hotword include the two or more AEDs performing the long-standing action. In some implementations, the operations further include outputting, for audible playback from the first AED, synthesized speech that corresponds to a response from the digital assistant to indicate performance of the long-standing action is in progress and the automatically created group hotword for use in follow-up queries that pertain to the long-standing action. In these implementations, the digital assistant revokes use of the automatically created group hotword when the long-standing action ends. In some examples, each AED in the selected group of AEDs is associated with a same device type or shares a common attribute, the group hotword assigned to the selected group of AEDs includes an implicit hotword that uniquely identifies the device type associated with the selected group of AEDs or the common attribute, and the hotword detection model is pre-trained to detect the presence of the group hotword in streaming audio without performing speech recognition on the audio data.

In some implementations, the group hotword assigned to the selected group of AEDs includes a proximity-based hotword that addresses only a subset of one or more AEDs from the selected group of AEDs that are currently closest in proximity to the user without explicitly identifying any particular AED in the subset of the one or more AEDs. The hotword detection model is pre-trained to detect the presence of the group hotword in streaming audio without performing speech recognition on the audio data and executing the collaboration routine causes the first AED and each other AED in the selected group of AEDs to each determine a respective proximity value relative to the user and perform arbitration using the respective proximity values across the selected group of AEDs to elect the subset of the one or more AEDs to fulfill performance of the operation specified by the query. Optionally, the group hotword may include one of a custom hotword created by the user or a predefined hotword selected from a list of one or more available group hotwords. During execution of the collaboration routine, the first AED and each other AED in the selected group of AEDs collaborate with one another by designating one of the AEDs in the selected group of AEDS to generate a speech recognition result for the audio data, perform query interpretation on the speech recognition result to determine that the speech recognition result identifies the query that specifies the operation to perform, and share the query interpretation performed on the speech recognition result with the other AEDs in the selected group of AEDs.

In some implementations, the query specifying the operation to perform includes a query for the selected group of AEDs to perform a long-standing operation and during execution by the collaboration routine, each AED in the selected group of AEDs collaborate with one another by pairing with one another for a duration of the long-standing operation and coordinating performance of sub-actions related to the long-standing operation. The operation specified by the query may include a device-level operation to perform on each AED in the selected group of AEDs and during execution of the collaboration routine, each AED in the selected group of AEDs collaborate with one another by fulfilling performance of the device-level operation independently.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is an example hotword registry containing a list of hotwords each assigned to a different selected group of assistant-enabled devices located in the speech-enabled environment of FIG. 4.

Like reference symbols in the various drawings indicate like elements.

DETAILED DESCRIPTION

Figure 1A:
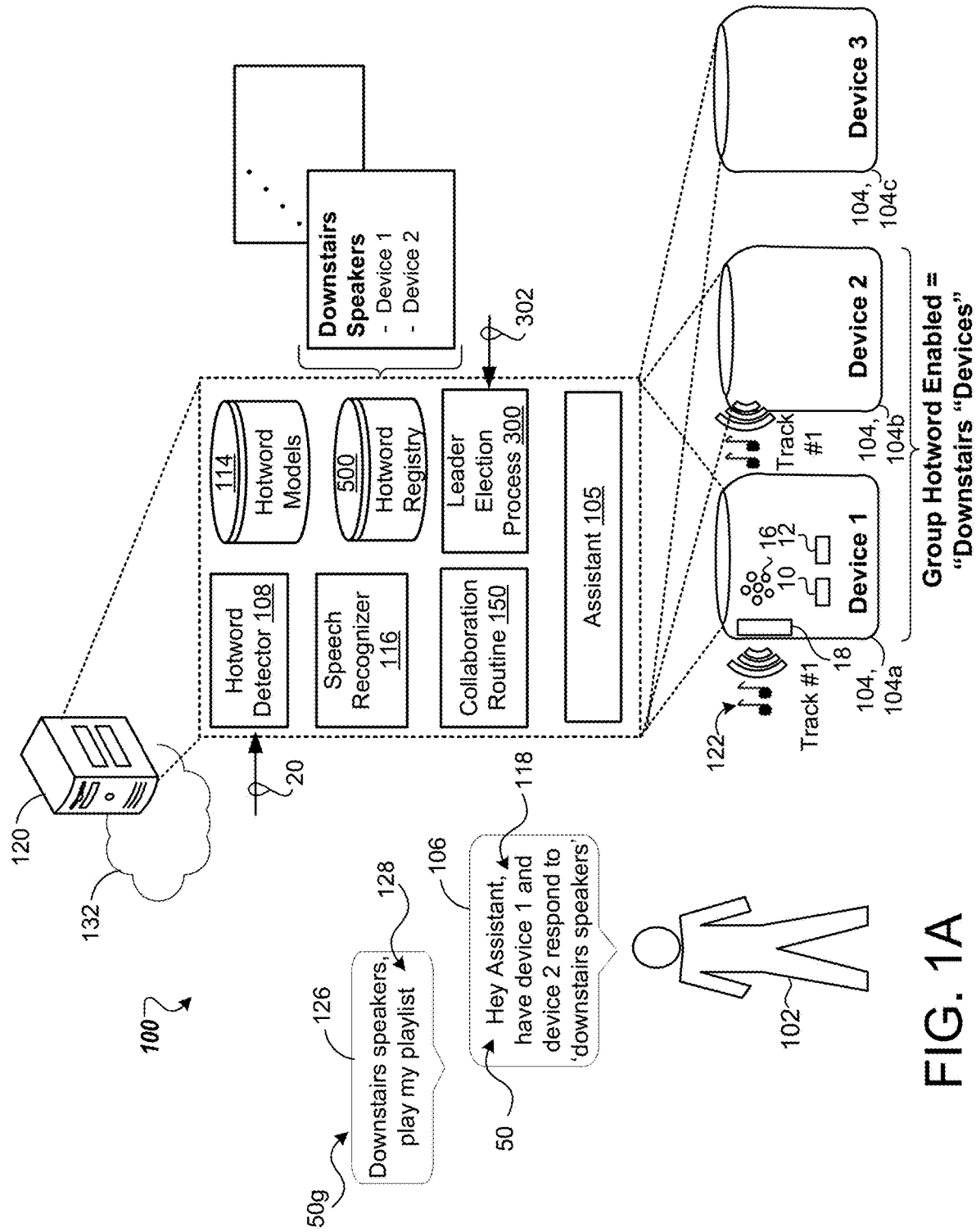
FIGS. 1A-1C are schematic views of a system for enabling and assigning a group hotword to a selected group of assistant-enabled devices.

Ideally, when conversing with a digital assistant interface, a user should be able to communicate as if the user were talking to another person, via spoken requests directed toward their assistant-enabled device running the digital assistant interface. The digital assistant interface will provide these spoken requests to an automated speech recognizer to process and recognize the spoken request so that an action can be performed. In practice, however, it is challenging for a device to always be responsive to these spoken requests since it is prohibitively expensive to run speech recognition continuously on a resource constrained voice-enabled device, such as a smart phone or smart watch.

To create user experiences supporting always-on speech, assistant-enabled devices typically run compact hotword detection models configured to recognize audio features that characterize a narrow set of phrases, that when spoken by the user, initiate full automated speech recognition (ASR) on any subsequent speech spoken by the user. Advantageously, hotword detection models can run on low power hardware such as digital signal processor (DSP) chips and may respond to various fixed-phrase commands such as "Hey Google" or "Hey living room speaker".

As the number of assistant-enabled devices within a user's environment (e.g., home or office) grows, the user may wish to trigger multiple assistant-enabled devices at the same time, e.g., to adjust a volume level across a group of assistant-enabled smart speakers or to adjust a lighting level across a group of assistant-enabled smart lights. When a user wants to trigger multiple different assistant-enabled devices, the user is presently required to issue separate queries to each device independently. For example, to turn off a kitchen light and a dining room light in the user's home, the user would have to speak separate queries such as, "Hey kitchen lightbulb, turn off" and "Hey dining room lightbulb, turn off".

Implementations herein are directed toward permitting a user to issue a single query to a group of assistant-enabled devices to allow for faster and more natural interactions with multiple different assistant-enabled devices (AEDs) the user may want to control simultaneously. Specifically, implementations are directed toward creating and assigning a group hotword to a group of two or more AEDs selected by a user such that each device will respond to a spoken query that includes the group hotword by triggering from a low-power state when the group hotword is detected in streaming audio. That is, each AED in the selected group of AEDs assigned the hotword may run a hotword detection model trained to detect the presence of the group hotword in streaming audio without performing speech recognition. In some implementations, the group hotword assigned to the selected group of AEDs is predefined such that the corresponding hotword detection model is pre-trained to detect the presence of the predefined group hotword. On the other hand, a user may also create a custom group hotword that includes any word or phrase the user wants to use for addressing a specific group of AEDs in a single query. Here, the user may be required to provide one or more training utterances of the user speaking the custom hotword to train a corresponding hotword detection model to detect the custom hotword.

In some examples, a user uses a digital assistant interface to select a group of AEDs and manually enable a group hotword (e.g., predefined or custom) to assign to the selected group of AEDs that the user wants to address simultaneously in a single query. The AEDs in the selected group of AEDs may receive an assignment instruction from the digital assistant interface assigning the group hotword to the group of AEDs, thereby configuring each AED in the selected group to wake-up from a low-power state when the group hotword is detected in streaming audio by at least one of the AEDs in the selected group of AEDs. For instance, the user may assign the group hotword "family room speakers" to a group of four smart speakers located in the family room of the user's home such that the user may address all four of these smart speakers by speaking an utterance that includes the group hotword "Family room speakers" followed by a single query, e.g., "play that Dec. 6, 1997 Phish show", specifying an operation to perform. In this instance, at least one of the smart speakers in the group of four smart speakers detecting the group hotword "Family room speakers" in the user's utterance will trigger the corresponding smart speaker to wake-up from a low-power state and execute a collaboration routine to cause each smart speaker in the group of four smart speakers to collaborate with one another to fulfill performance of the operation specified by the query. For example, the four family room speakers may collaborate to playback music corresponding to a concert performed by the band Phish on the date Dec. 6, 1997. In this example, one of the speakers may be tasked with streaming the music from a local storage device, a network storage device, or from a remote streaming service, and then broadcasting the music to the other speakers to audibly playback the music from the speakers. Optionally, in collaborating to fulfill the operation, some of the smart speakers may perform different playback responsibilities related to the operation such as two of the smart speakers may play audio corresponding to a left channel and the other two of the smart speakers may play audio corresponding to a right channel, thereby providing a stereo arrangement.

Continuing with this same example, other AEDs not in the selected group assigned to the group hotword, such as AEDs corresponding to device types other than smart speakers and smart speakers located in rooms other than the family room of the user's home, will not respond to the group hotword and will remain in a sleep state when the user speaks "Family room speakers". Additionally, each AED may be assigned a unique device-specific hotword that only the corresponding AED is configured to detect in streaming audio when the user only wants to address the corresponding AED. For instance, a unique device-specific hotword assigned to an AED may include an identifier of the AED such as "Hey Device 1", or could include a device type and/or other attribute associated with the AED such as "Hey Smart Speaker 1". Furthermore, the selected group of four smart speakers located in the family room, as well as any other AED associated with the user but not assigned the group hotword, may be configured to also respond to a global default hotword such as "Hey Assistant". In some examples, it is possible that at least one AED associated with a user is assigned two or more group hotwords simultaneously such that the at least one AED will be a member of different selected groups of AEDs each assigned a corresponding one of the two or more group hotwords. In these examples, each selected group of AEDs may include a combination of AEDs assigned a corresponding group hotword that is different than the combination of AEDs assigned a different corresponding hotword.

In some implementations, the user manually enables a group hotword to assign to a selected group of AEDs. For instance, the user may access a digital assistant application that displays a graphical user interface for permitting the user to configure and adjust settings of all AEDs associated with the user. Here, the graphical user interface may provide a group hotword screen that renders various graphical objects (text fields, buttons, pull-down menus) for creating and enabling group hotwords and selecting which AEDs the user wants to assign the group hotwords to. As such, a selected group of AEDs may receive an assignment instruction to assign a group hotword responsive to receiving a user input indication indicating user interaction with one or more objects displayed in the graphical user interface to instruct the digital assistant to enable the group hotword and each AED in the selected group of AEDs to be assigned the group hotword. The user may update the selected group of AEDs via the GUI by selecting one or more additional AEDs to add to the group and/or selecting one or more AEDs to remove from the group.

The user may also select a group of AEDs and enable a group hotword to assign to the selected group of AEDs via a voice input corresponding to a group hotword query. Here, the user may speak a voice input requesting the digital assistant to enable the group hotword and assign the group hotword to the selected group of AEDs. For instance, the voice input spoken by the user to enable the group hotword to assign to a first AED and a second AED located in a downstairs zone of the user's home may include "Device 1 and device 2, respond to downstairs devices". Here, the term "Device 1" spoken by the user includes a respective device-specific hotword assigned to the first AED and the term "Device 2" spoken by the user includes a different respective device-specific hotword assigned to the second AED such that each of the first and second AEDs will detect their respective device-specific hotword and wake-up to process the following audio data corresponding to the group hotword query "respond to downstairs devices". As such, at least one of the first AED or the second AED may instruct a speech recognizer (e.g., on-device ASR or server-side ASR) to perform speech recognition on the audio data to generate an ASR result for the voice input and then perform query interpretation on the ASR result to identify the group hotword query. The group hotword query identified by the query interpretation performed on the ASR result specifies a name of the group hotword (e.g., "downstairs devices") to enable and each AED in the selected set of AEDs to be assigned the group hotword. The user could have similarly provided the voice input corresponding to the group hotword query by invoking the digital assistant directly through a global hotword. For example, the user could speak the group hotword query "Hey Assistant, have device 1 and device 2 respond to downstairs devices". In this example, any AED associated with the user may detect the predefined default hotword "Hey Assistant" and wake-up to initiate speech recognition on the audio data to generate the ASR result and perform speech recognition to identify the group hotword and each AED in the selected group of AEDs to be assigned the group hotword.

As with the GUI example above, the user may similarly update the selected group of AEDs via subsequent voice inputs that specify one or more additional AEDs to add to the group and/or selecting one or more AEDs to remove from the group. For instance, the user may speak "Hey downstairs devices, add device 3" to add a third AED 104c (device 3) to the group of AEDs assigned the group hotword "downstairs devices". Similarly, the user may speak "Hey device 1, leave the downstairs devices group" to remove the first AED 104a (device 1) from the group so that the first AED is no longer assigned the group hotword and will not trigger when the user speaks "Hey downstairs devices". The user may provide a spoken confirmation to confirm (o0r undo) and update made to the group of AEDs. Additionally, once all devices have left the selected group, the hotword may cease to exist requiring the user to re-create or re-enable the group hotword.

In additional examples, a group hotword is available implicitly. For instance, the user may speak the group hotword "Hey nearby devices" or "Hey nearby device" to only address AEDs in close proximity to the user. The hotword detector could detect both the singular and plural group hotword, or only detect the singular and rely on speech recognition to recognize the suffix "s". This type of implicit group hotword includes a proximity-based group hotword. The user may access the digital assistant application and interact with the GUI to specify which AEDs should be assigned an implicit proximity-based group hotword. Accordingly, the group hotword in this instance provides context to specify that the user only wants to invoke one or more AEDs that are currently closest to the user in proximity without requiring the user to explicitly identify those AEDs, whether by a respective unique hotword assigned thereto or naming the AEDs in a query portion of the utterance. Notably, each AED assigned the implicit proximity-based group hotword may run a hotword detection model to detect the presence of the group hotword in streaming audio to trigger the wake-up process and initiate speech recognition on the audio. As the implicit group hotword in this instance is proximity-based, even though multiple AEDs may detect the group hotword in captured streaming audio, these AEDs may each subsequently process the audio to determine a respective proximity value relative to the user and then perform arbitration using these proximity values across the multiple AEDs to elect one or more of these AEDs to fulfill an operation specified by the user's query. Here, AEDs outside some upper distance threshold from the user may be ineligible to fulfill the query. Optionally, AEDs inside some lower distance threshold, such as a smart phone AED in the user's pocket that detected the proximity based group hotword "Hey nearby device(s)", may also be ineligible to respond to the query. The user also has the option to add/remove AEDs from the selected group assigned the proximity-based group hotword.

Additionally or alternatively, the one or more AEDs elected to respond to the user's query may be based on the type of query and/or respective device properties associated with each AED so that only one or more AEDs best equipped to fulfill the query are elected. Here, the device properties associated with each AED may include processing capabilities, device type, user-configurable device settings, power usage, battery level, physical location of the AED, or network capabilities, etc. As such, when the query is a single-device query such as "Hey nearby device, set a timer", device arbitration may determine that the closest AED to the user is ineligible to fulfill the query because the AED is a battery-powered smart speaker and the battery capacity is very low (e.g., less than 5-percent). Accordingly, a next closest AED assigned the implicit proximity-based group hotword may fulfill the query.

In some implementations, implicit group hotwords are assigned to AEDs in a selected group that are associated with a same device type. For instance, an implicit device-type group hotword could include "Hey smart speakers" to address all AEDs associated with the user that include the device type of smart speakers. Similarly, another implicit device-type group hotword could include "Hey smart lights" to address all AEDs that include the device type of smart lights. Notably, device-type group hotwords provide context indicating which AEDs the user wants to address by uniquely identifying the device type associated with the selected group of AEDs. Each AED may run a hotword detection model that is pre-trained to detect the presence of device-type group(s) hotword in streaming audio without performing speech recognition on the audio data.

In additional implementations, an implicit group hotword is assigned to AEDs in a selected group that share a common attribute. For instance, an implicit attribute-based group hotword could include "Hey blue devices" to address all AEDs associated with the user that are labeled as having the color blue or "Hey red devices" to address all AEDs associated with the user that are labeled as having the color red.

Attribute-based group hotwords could similarly specify any other attribute such as size, e.g., "Hey large devices" or "Hey small devices". Notably, attribute-based group hotwords can further narrow down a specific group of AEDs a user wants to address. In a non-limiting example, where the implicit device-type group hotword "Hey smart speakers" would address all smart speakers throughout the user's home and the manually-enabled group hotword "Hey family room speakers" would address only four smart speakers located in the family room of the user's home, the implicit attribute-based group hotword "Hey blue devices" could be used to address only two of the four smart speakers located in the family room of the user that are labeled as having the color appearance red.

The implicit group hotwords may be enabled/disabled via the GUI of the digital assistant application. Similarly, the group of AEDs assigned implicit group hotwords may be specified/selected via the GUI of the digital assistant application. The selected group of AEDs assigned an implicit group hotword may be updated by adding additional AEDs to the group and/or removing AEDs from the group as described above.

In yet additional implementations, the digital assistant automatically creates and assigns a group hotword to a selected group of AEDs performing a long-standing action while the long-standing action is in progress. For instance, a user may speak a voice query/command that commands the digital assistant to perform a long-standing action on two or more AEDs. In a non-limiting example, the voice query/command "Hey Assistant, play party music playlist on speaker 1 and speaker 2" causes the digital assistant to perform the long-standing operation by streaming the user's party music playlist as audible playback from speakers 1 and 2. In this example, the digital assistant is configured to automatically create an action-specific group hotword "Party music" for the user to use in follow-up queries pertaining to the long-standing operation. As such, speaker 1 and speaker 2 each receive an assignment instruction assigning the group hotword "Party music" that was automatically created by the digital assistant. Thereafter, the user may address the long-standing operation performed on speakers 1 and 2 by simply speaking "Party music". For instance, the user may speak utterances such as "Party music, next song" or "Party music, turn up the volume" to advance to a next track in the playlist or instruct the speakers 1 and 2 to each increase their volume. To inform the user of the action-specific group hotword created by the digital assistant, the digital assistant may output, for audible playback from one of the AEDs (e.g., speaker 1 or speaker 2), synthesized speech corresponding to a response to indicate performance of the long-standing operation is in progress and the automatically created group hotword for use in follow-up queries that pertain to the long-standing action. In the example above, the response may include synthesized speech that conveys "Got it, now playing that. In the future, you can control playback using the 'party music' hotword". The digital assistant may revoke use of the automatically created group hotword when the long-standing action ends.

Figure 1B:
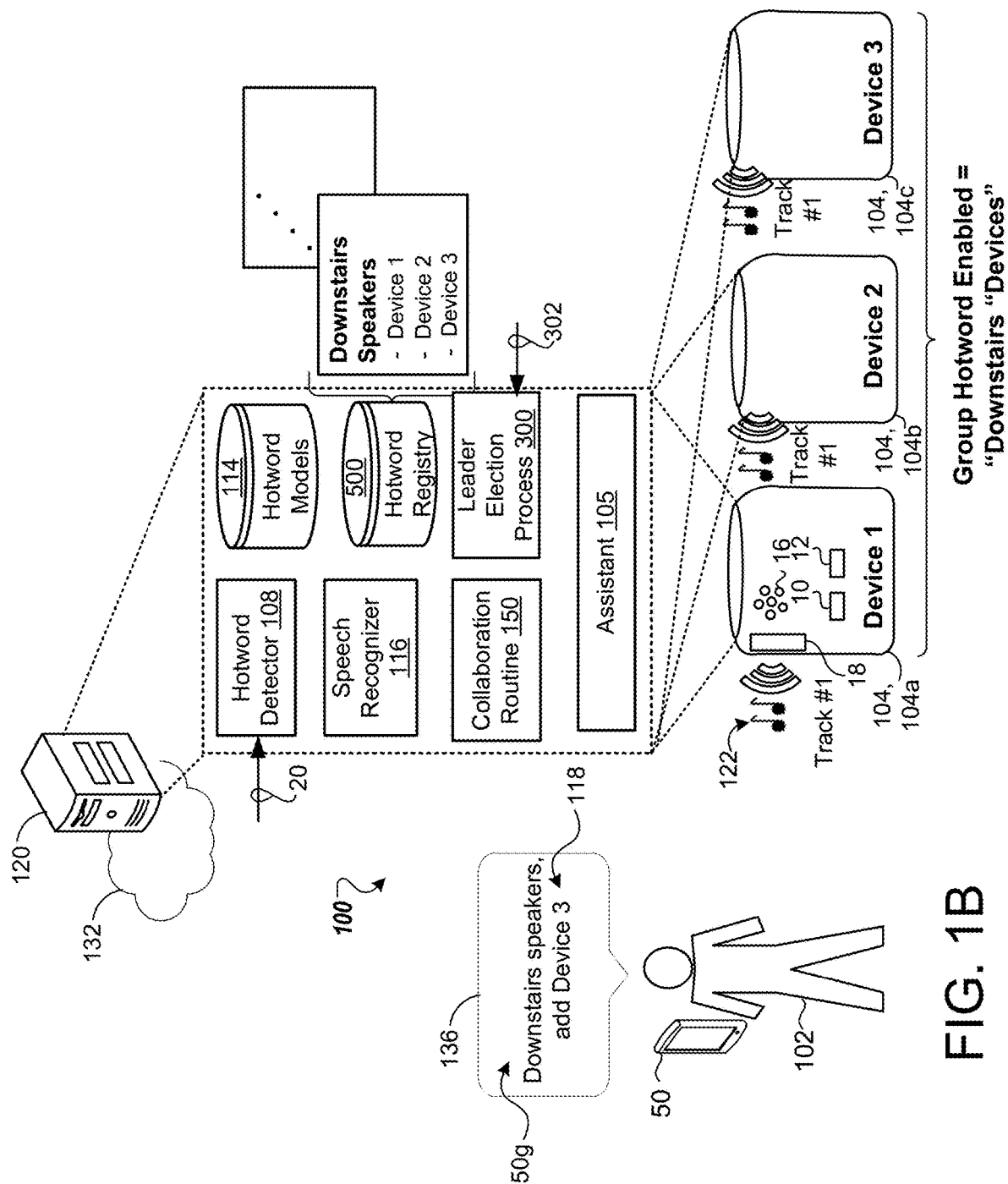
Figure 1C:
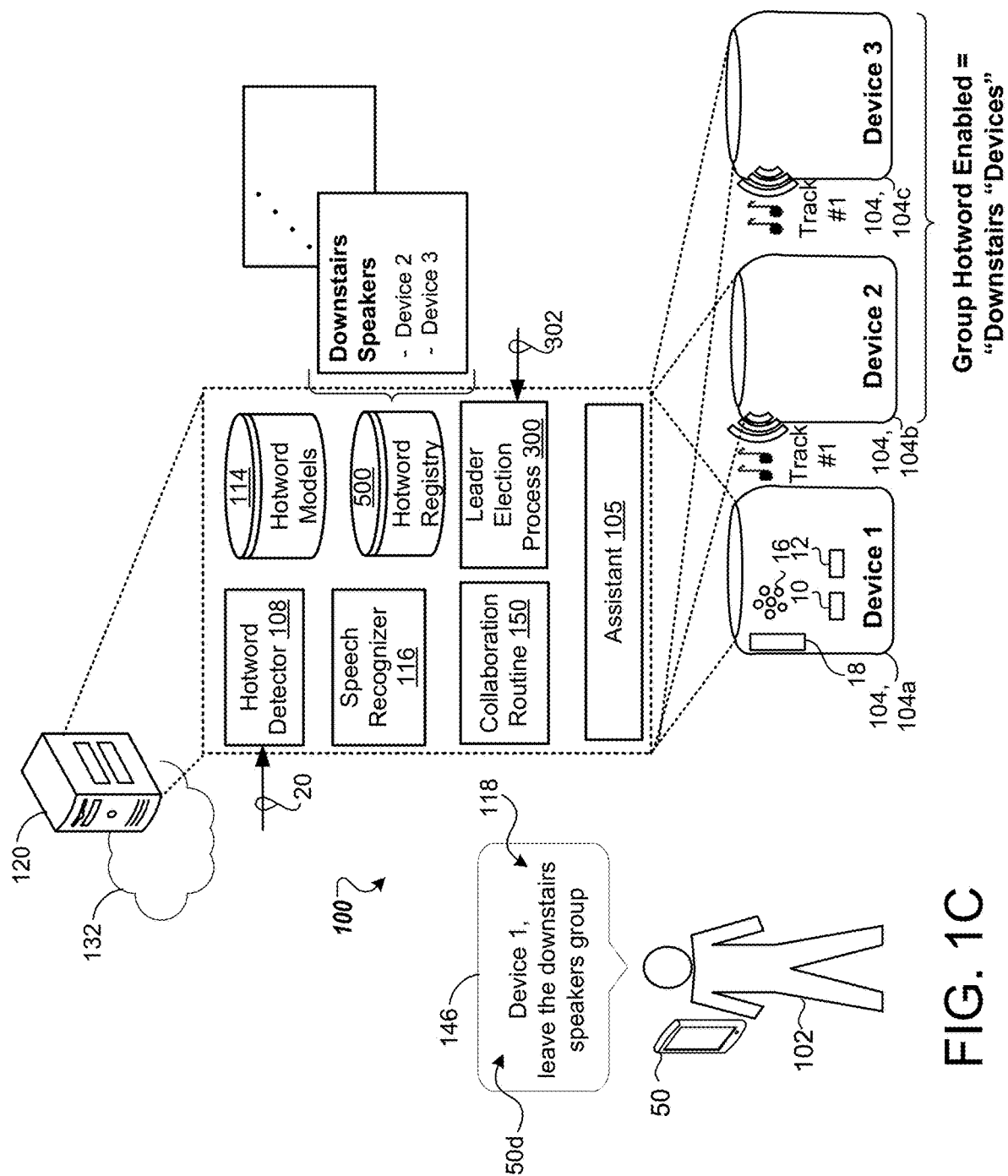

FIGS. 1A-1C illustrate a system 100 for assigning a group hotword 50g to a selected group of two or more assistant-enabled devices (AEDs) 104 associated with a user 102 to permit the user 102 to address the selected group of two or more AEDs in a single query by speaking the group hotword 50g. Briefly, and as described in more detail below, FIG. 1A shows the user 102 manually-enabling a group hotword to assign to a selected group of two or more AEDs 104, 104a-c associated with the user 102 by speaking an utterance 106, "Hey Assistant, have device 1 and device 2 respond to downstairs speakers". In response to the utterance 106, a digital assistant 105 executing on the AEDs 104 (and optionally a remote server 120 in communication with the AEDs) provides assignment instructions assigning the group hotword "downstairs speakers" to the selected group of AEDs 104 that includes a first AED 104a named "device 1" and a second AED 104b named "device 2". Each AED 104a, 104b assigned the group hotword is configured to wake-up from a low-power state when the group hotword is detected in streaming audio by at least one of the AEDs in the selected group of AEDs 104a, 104b. For instance, when the user speaks a subsequent utterance 126, "Downstairs speakers, play my playlist", the first AED 104a and the second AED 104b detect the group hotword "Downstairs speakers" in audio data corresponding to the utterance 126 that triggers each AEDs 104a, 104b to wake-up from a low-power state and execute a collaboration routine 150 to collaborate with one another to begin to play music 122 from the user's 102 playlist (e.g., Track #1).

In the example shown, the system 100 includes three AEDs 104a-c associated with the user 102 and executing the digital assistant 105 that the user 102 may interact with through speech. While three AEDs 104 are depicted, the user 102 may include any number of AEDs 104 located throughout a speech-enabled environment associated with the user 102. While the AEDs 104 all correspond to smart speakers, AEDs 104 can include other computing devices without departing from the scope of the present disclosure, such as, without limitation, a smart phone, tablet, smart display, desktop/laptop, smart watch, smart appliance, headphones, or vehicle infotainment device. Each AED 104 includes data processing hardware 10 and memory hardware 12 storing instructions that when executed on the data processing hardware 10 cause the data processing hardware 10 to perform operations. Each AED 104 includes an array of one or more microphones 16 configured to capture acoustic sounds such as speech directed toward the AED 104. Each AED 104 may also include, or be in communication with, an audio output device (e.g., speaker) 18 that may output audio such as music 122 and/or synthesized speech 450 (FIG. 4) from the digital assistant 105.

FIG. 1A shows the user 102 speaking the utterance 106, "Hey Assistant, have device 1 and device 2 respond to downstairs speakers" in the vicinity of at least the first AED 104a to request the digital assistant 105 to enable the group hotword "downstairs speakers" and assign the group hotword to a selected group of AEDs that includes the first AED 104a named "device 1" and the second AED 104b named "device 2". The microphone 16 of the first AED 104a receives the utterance 106 and processes audio data 20 that corresponds to the utterance 106. The initial processing of the audio data 20 may involve filtering the audio data 20 and converting the audio data 20 from an analog signal to a digital signal. As the first AED 104a processes the audio data 20, the first AED 104a may store the audio data 20 in a buffer of the memory hardware 12 for additional processing. With the audio data 20 in the buffer, the first AED 104a may use a hotword detector 108 to detect whether the audio data 20 includes a predefined global hotword 50 "Hey Assistant" assigned to each AED associated with the user 102. The hotword detector 108 is configured to identify hotwords that are included in the audio data 20 without performing speech recognition on the audio data 20. The hotword detector 108 may include an initial hotword detection stage that coarsely listens for the presence of the hotword 50, and if detected, triggers a second hotword detection stage to confirm the presence of the hotword 50. The initial hotword detection stage may execute on a low-power digital signal processor (DSP) of the data processing hardware 10, while the second hotword detection stage may run on a more computationally intensive application processor (AP) (e.g. system on a chip (SoC)) to provide more accurate hotword detection.

In some implementations, the hotword detector 108 is configured to identify hotwords that are in the initial portion of the utterance 106. In this example, the hotword detector 108 may determine that the utterance 106 "Hey Assistant, have device 1 and device 2 respond to downstairs speakers" includes the predefined global hotword 50 "Hey Assistant" if the hotword detector 108 detects acoustic features in the audio data 20 that are characteristic of the hotword 50. The acoustic features may be mel-frequency cepstral coefficients (MFCCs) that are representations of short-term power spectrums of the utterance 106 or may be mel-scale filterbank energies for the utterance 106. For example, the hotword detector 108 may detect that the utterance 106 "Hey Assistant, have device 1 and device 2 respond to downstairs speakers" includes the hotword 50 "Hey Assistant" based on generating MFCCs from the audio data 20 and classifying that the MFCCs include MFCCs that are similar to MFCCs that are characteristic of the hotword "Hey Assistant" as stored in a hotword model of the hotword detector 108. As another example, the hotword detector 108 may detect that the utterance 106 "Hey Assistant, have device 1 and device 2 respond to downstairs speakers" includes the hotword 50 "Hey Assistant" based on generating mel-scale filterbank energies from the audio data 402 and classifying that the mel-scale filterbank energies include mel-scale filterbank energies that are similar to mel-scale filterbank energies that are characteristic of the hotword "Hey Assistant" as stored in the hotword model of the hotword detector 108.

When the hotword detector 108 determines that the audio data 20 that corresponds to the utterance 106 includes the predefined global hotword 50, the AED 104 may trigger a wake-up process to initiate speech recognition on the audio data 20 that corresponds to the utterance 106. For example, a speech recognizer 116 running on the AED 104 may perform speech recognition and/or semantic interpretation on the audio data 20 that corresponds to the utterance 106. The speech recognizer 116 may perform speech recognition on the audio data 20 to generate an automated speech recognition (ASR) result for the utterance 106 and then perform query interpretation on the ASR result to identify a group hotword query 118 that specifies a name of the group hotword to enable and each AED 104 in the selected group of AEDs to be assigned the group hotword. In this example, the speech recognizer 116 may perform query interpretation on the ASR result that includes the phrase "have devices 1 and 2 respond to downstairs devices" as the group hotword query 118 that specifies the name "downstairs speakers" of the group hotword and each AED 104a, 104b "device 1 and device 2" in the selected group of AEDs 104 to be assigned the group hotword.

In some implementations, the speech recognizer 116 is located on a server 120 in addition to, or in lieu, of the AEDs 104. Upon the hotword detector 108 triggering the AED 104a to wake-up responsive to detecting the predefined global hotword 50 in the utterance 106, the AED 104a may transmit the audio data 20 corresponding to the utterance 106 to the server 120 via a network 132. The AED 104a may transmit the portion of the audio data 20 that includes the hotword 50 for the server 120 to confirm the presence of the global hotword 50. Alternatively, the AED 104a may transmit only the portion of the audio data 20 that corresponds to the portion of the utterance 106 after the global hotword 50 to the server 120. The server 120 executes the speech recognizer 116 to perform speech recognition and returns a transcription of the audio data 20 to the AED 104a. In turn, the AED 104a identifies the words in the utterance 106, and the AED 104a performs semantic interpretation and identifies the group hotword query 118. The AED 104a (and/or the server 120) may identify the group hotword query 118 for the digital assistant 105 to enable and provide assignment instructions assigning the group hotword "downstairs speakers" to the selected group of AEDs 104 that includes the first AED 104a and the second AED 104b. In the example shown, the digital assistant 105 begins to perform the long-standing operation of playing music 122 as playback audio from the speaker 18 of the AED 104. The digital assistant 105 may stream the music 122 from a streaming service (not shown) or the digital assistant 105 may instruct the AED 104 to play music stored on the AED 104.

After the group hotword 50g "downstairs devices" is enabled and assigned to the first and second AEDs 104a, 104b, the respective hotword detector 108 running on each of the first and second AEDs 104a, 104b is configured to identify the group hotword 50g "downstairs devices" in audio data 20 corresponding to subsequent utterances 126. Here, each respective hotword detector 108 may activate a respective group hotword model 114 to run on the respective AED 104a, 104b that is trained to detect subsequent utterances 126 of the group hotword 50g "downstairs speakers" in streaming audio captured by the respective AED 104a, 104b without performing speech recognition on the captured audio. The group hotword model 114 may be stored on the memory hardware 12 of the AEDs 104 or the server 120. If stored on the server 120, the AEDs 104 may request the server to retrieve the group hotword model 114 for a corresponding group hotword 50g and provide the retrieved group hotword model 114 so that the AEDs 104 can activate the group hotword model 114. In some examples, the group hotword 50g is predefined and available as a suggested group hotword that the user 102 may enable and assign to the selected group of AEDs 104. In these examples, the corresponding group hotword model 114 is pre-trained to detect the group hotword 50g in streaming audio. In other examples, the group hotword 50g is a custom group hotword created by the user. In these other examples, the user 102 may train a corresponding group hotword model 114 to detect the custom group hotword 50g by speaking training utterances that include the user 102 speaking the custom group hotword 50g.

In additional implementations, assigning the group hotword to the selected group of AEDs 104 causes one or more of the AEDs 104 to execute the speech recognizer 116 in a low-power and low-fidelity state where the speech recognizer 116 is constrained or biased to only recognize the group hotword 50g assigned to the AEDs 104 when spoken in subsequent utterances 126 captured by the AEDs 104. Since the speech recognizer 116 is only recognizing a limited number of terms/phrases, the number of parameters of the speech recognizer 116 may be drastically reduced, thereby reducing the memory requirements and number of computations needed for recognizing the group hotword 50g in speech. Accordingly, the low-power and low-fidelity characteristics of the speech recognizer 116 may be suitable for execution on a digital signal processor (DSP). In these implementations, the speech recognizer 116 executing on at least one of the AEDs 104 may recognize an utterance 106 of the enabled group hotword 50g in streaming audio captured by the at least one AED 104 in lieu of using a group hotword model 114.

One or more of the AEDs 104 may store a hotword registry 500 locally on the memory hardware 12. The hotword registry 500 contains a list of one or more hotwords 50 each assigned to one or more AEDs 104 associated with the user 102. The digital assistant 105 and/or the AEDs 104 in the selected group may populate the hotword registry 500 to include the enabled group hotword 50g in the list of one or more hotwords and identify each AED 104 in the selected group of AEDs 104 assigned the group hotword 50g. Upon enabling and assigning the group hotword 50g "downstairs speakers" to the first AED 104a named Device 1 and the second AED 104b named Device 2, FIG. 1A shows the digital assistant 105 updating the hotword registry 500 to designate the assignment of the group hotword 50g "downstairs speakers" to Device 1 and Device 2.

Figure 3:
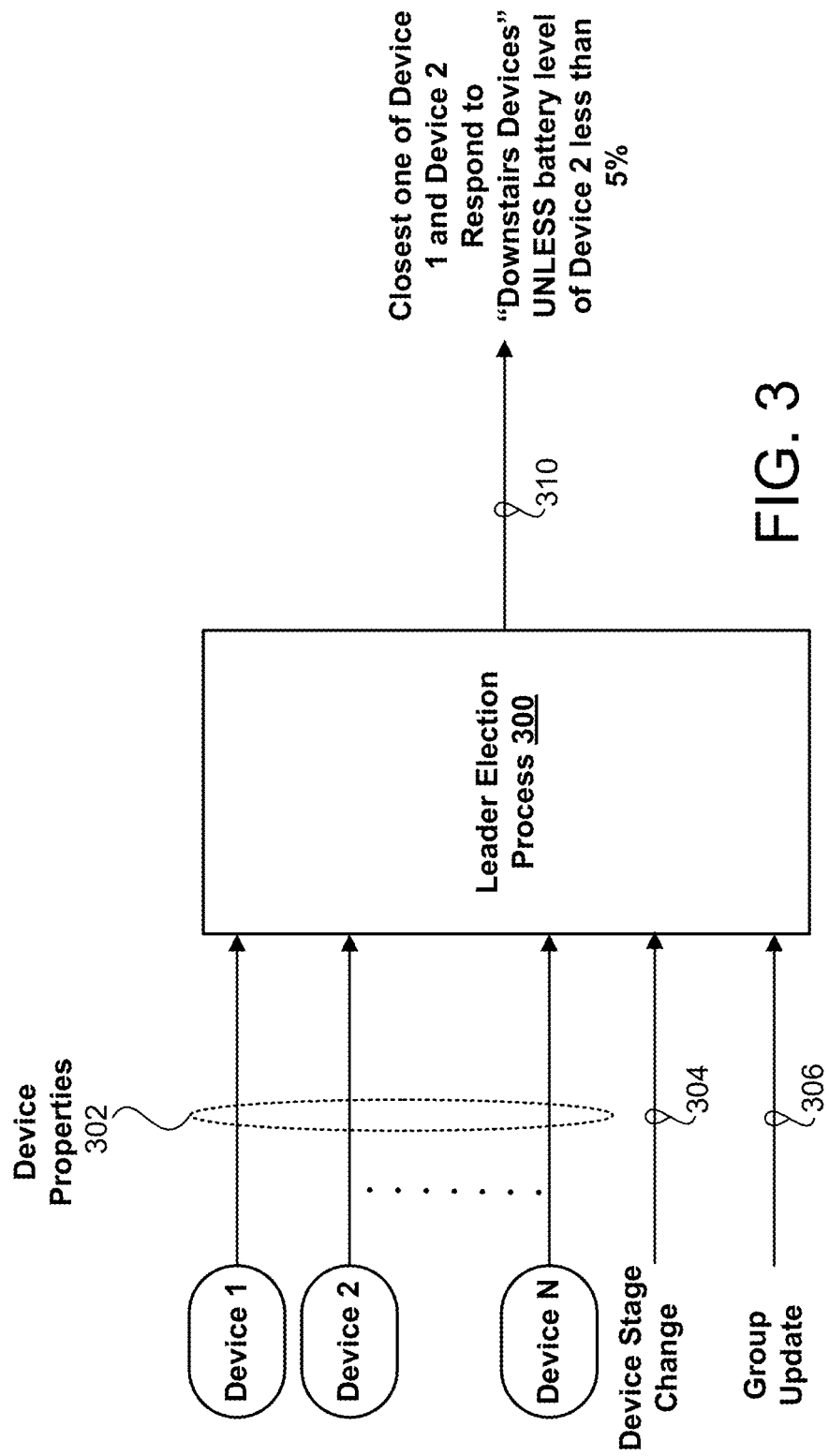
FIG. 3 is a schematic view of an example leader election process for electing one or more assistant-enabled devices to listen for a presence of a group hotword in streaming audio.

In some examples, after the first and second AEDs 104a, 104b in the selected group of AEDs receive the assignment instruction assigning the group hotword 50g, the first and second AEDs 104a, 104b execute a leader election process 300 to elect, based on respective device properties 302 associated with each AED 104, one or more AEDs from the selected group to listen for the presence of the group hotword 50g in the streaming audio on behalf of the selected group of AEDs. FIG. 3 shows an example leader election process 300 configured to receive, as input, the respective device properties 302 associated with each AED 104 in a selected group of AEDs, and generate, as output, election instructions 310 electing one or more of the AEDs to listen for the presence of the group hotword 50g. The device properties 302 associated with each AED 104 may include, without limitation, at least one of processing capabilities, device type, user-configurable device settings, power usage, battery level, physical location of the AED, or network capabilities. In the example of FIG. 1A, the device properties 302 associated with the second AED 104b named Device 2 may indicate that the second AED 102b is a portable device and is currently powered by a battery whereas the device properties 302 associated with the first AED 104a named Device 1 may indicate that the first AED 102a is a stationary device powered by an external power source, e.g., a power outlet. As such, the election instructions 310 output by the leader election process 300 may indicate that the closest one of the Device 1 or Device 2 relative to the user 102 speaking "downstairs devices" should respond by performing speech recognition and semantic interpretation to identify the query unless the battery level of Device 2 is less than 5-percent (5%). That is, when the subsequent utterance 126 that includes the group hotword 50g "downstairs devices" is detected in streaming audio by each of the AEDs 104a, 104b, execution of the collaboration routine 150 by the AEDs 104a, 104b will cause the second AED 104b named Device 2 to not respond if the battery level is less than 5-percent even if Device 2 is closest to the user 102. This would allow the Device 2 to conserve power by not having to consume processing resources to perform speech recognition and/or semantic interpretation on the audio data. Otherwise, when power conservation is not a concern, the leader election process 300 may generally elect a closest AED 104 to process audio since the audio captured by that AED 104 is more likely to have a higher quality than the audio captured by further AEDs 104, and therefore provide more accurate speech recognition.

In additional examples, the leader election process 300 is capable of generating more granular election instructions 310. For instance, the election instructions 310 may elect only one of the AEDs 104 to trigger second stage hotword detection (i.e., using a computationally-intensive hotword detection model 114 or using the speech recognizer 116) to confirm the presence of the group hotword 50g when a first stage hotword detector 108 initially detects the group hotword 50g. That is, the election instructions 310 may inform each AED 104 in the selected group of AEDs assigned the group hotword 50g that when each AED 104 detects the presence of the group hotword 50g using the first stage hotword detector 108, that only an elected one of the AEDs 104 will trigger second stage hotword detection to confirm the presence of the group hotword 50g. Expanding further, device properties 302 may indicate that one of the AEDs is battery-powered and configured to run a first stage hotword detector 108 on a DSP chip which consumes low power at the cost of low-fidelity to coarsely listen for the group hotword 50g, and once the group hotword 50g is detected by the first stage hotword detector 108, an application processor (e.g., SoC chip) is triggered to wake up and run the second stage hotword detection (e.g., hotword model 114 or on-device ASR 116) to confirm the presence of the group hotword 50g. Thus, if the device properties 302 indicate that one or more other AEDs in the selected group of AEDs are non-battery powered devices, it may be efficient to leverage those devices for at least the task of second stage hotword detection so the battery-powered device does not waste power by triggering the AP to wake-up from a low-power state.

Other scenarios may exist where device properties 302 for an AED in a selected group of AEDs indicate that the AED capable of performing speech recognition on-device for a limited set of common queries/commands while other AEDs in the selected group need to provide audio to the server 120 to perform server-side ASR. The leader election process 300 may generate election instructions 310 that cause the collaboration routine 150 to elect the AED that is capable of performing on-device speech recognition to attempt to perform speech recognition on captured audio data 20 on-device first to determine if one of the common queries/commands in the limited set is recognized in the captured audio data 20. If one of the common queries/commands is not recognized, the generated election instructions 310 may permit the collaboration routine 150 to elect one of the other AEDs to provide the audio data 20 to the server 120 to perform server-side ASR on the audio data 20.

With continued reference to FIG. 3, the AEDs 104 in the selected group of AEDs 104 may re-execute the leader election process 300 periodically and/or in response to specific events. In one example, re-executing the leader election process 300 occurs responsive to a device state change 304 at one of the AEDs in the selected group of AEDs 104. The device state change 304 may include, without limitation, processing load on the AED 104 increasing to a level that violates a processing threshold, processing load on the AED 104 reducing to a level that no longer violates the processing level, a change in background noise levels, a battery capacity falling below a battery capacity threshold, a loss of network connection, the AED 104 powering off, etc. The device state change 304 allows the leader election process 300 to re-evaluate the respective device properties 302 associated with each AED 104 in the selected group to elect the one or more AEDs that are currently best suited to listen for the group hotword.

In one example, re-executing the leader election process 300 occurs responsive to an update 306 to the selected group of AEDs 104 that adds one or more additional AEDs 104 to the selected group of AEDs 104. For instance, FIG. 1B shows the user 102 speaking another utterance 136, "Downstairs speakers, add device 3" in the vicinity of at least the first AED 104a to request the digital assistant 105 to assign the group hotword 50g "downstairs speakers" to the third AED 104c named "Device 3" in addition to the first and second AEDs 104a, 104b named Device 1 and Device 2. Here, the utterance 136 includes the group hotword 50g "downstairs speakers" that at least the first AED 104a (i.e., based on the election instructions 310) detects, using the hotword detection model 114 corresponding to the group hotword 50g, in audio data 20 corresponding to the utterance 136 to trigger the first AED 104a to wake-up from the low-power state. Once awake, the first AED 104a instructs a speech recognizer 116 to perform speech recognition on the audio data 20 to generate an ASR result for the utterance 136 and performs query interpretation on the ASR result to identify the group hotword query 118 that specifies a device identifier "Device 3" for an additional AED 102c to add to the selected group of AEDs 104 assigned the group hotword 50g "downstairs devices". Accordingly, the third AED 104c may receive an assignment instruction assigning the group hotword 50g "downstairs speakers" to the selected group of AEDs that has been updated to now include the third AED 104c. The third AED 104c may activate the hotword detection model 114 corresponding to the group hotword 50c as described above with reference to FIG. 1A. The digital assistant 105 may update the hotword registry 500 to add the third AED 104c named Device 3 to the selected group of AEDs 104 assigned the group hotword 50g "downstairs speakers". The leader election process 300 of FIG. 3 may re-execute to consider the respective device properties 302 associated with the third AED 104c responsive to the update 306 adding the third AED 104c to the selected group of AEDs 104. All three AEDs 104a-c may collaborate with one another to fulfill performance of the long-standing operation of streaming the music 122 from the user's playlist.

Additionally or alternatively, re-executing the leader election process 300 may occur responsive to an update 306 to the selected group of AEDs 104 that removes one or more AEDs 104 from the selected group of AEDs 104. For instance, FIG. 1C shows the user 102 speaking another utterance 146, "Device 1, leave the downstairs speakers group" in the vicinity of at least the first AED 104a to request the digital assistant 105 to remove the first AED 104a named Device 1 from the selected group of AEDs 104 assigned the group hotword 50g "downstairs speakers". Here, the utterance 146 includes a device-specific hotword 50d "Device 1" uniquely assigned to the first AED 104a and detected by the first AED 10a in audio data 20 corresponding to the utterance 146 to trigger the first AED 104a to wake-up from the low-power state and process the audio data 20 to identify the group hotword query 118 requesting the digital assistant 105 to remove the first AED 104a from the selected group of AEDs 104 assigned the group hotword 50g "downstairs speakers". Accordingly, the first AED 104a may deactivate the hotword detection model 114 corresponding to the group hotword 50g so that the first AED 104a no longer listens for the presence of the group hotword 50g in audio data. The digital assistant 105 may update the hotword registry 500 to remove the first AED 104a named Device 1 from the selected group of AEDs 104 assigned the group hotword 50g "downstairs speakers". The leader election process 300 of FIG. 3 may re-execute to determine updated election instructions 310 based on Device 1 no longer being a member of the selected group of AEDs. The second and third AEDs 104b, 104c may now collaborate with one another without the first AED 104a to fulfill performance of the long-standing operation specified by the query 128 in the utterance 126 spoken by the user 102 in FIG. 1A.

Referring back to FIG. 1A, at least the first AED 104a detects, using the corresponding group hotword model 114, the presence of the group hotword 50g "downstairs devices" in audio data 20 corresponding to a subsequent utterance 126 spoken by the user 102 that includes a query 128 specifying an operation to perform. Specifically, the example shows the user 102 speaking the subsequent utterance 126 "Downstairs speakers, play my playlist" and at least the first AED 104a using the group hotword model 114 to detect the group hotword 50g "downstairs devices" in the corresponding audio data 20. Detecting the group hotword 50g in the audio data 20 triggers the first AED 104a (and optionally the second AED 104b) to wake-up from the low-power state and execute the collaboration routine 150 to cause the first AED 104a and each other AED 104 assigned to the group hotword 50g to collaborate with one another to fulfill performance of the operation specified by the query 128. Here, the query 128 specifies a long-standing operation and the first and second AEDs 104a, 104b collaborate with one another by pairing with one another for a duration of the long-standing operation and coordinating performance of sub-actions related to the long-standing operation to playback music 122 from the user's playlist. For instance, one AED 104 may perform a sub-action of connecting to a remote music streaming service to stream the playlist and broadcast the streaming playlist to the other AED 104. In some examples, the collaborating AEDs 104 may assume different music playback responsibilities such as one of the AEDs assuming the role of a left audio channel and the other one of the AEDs assuming the role of a right audio channel to provide a stereo arrangement. FIG. 1A shows the first AED 104a named Device 1 and the second AED 104b named Device 2 executing the collaboration routine 150 to collaborate with each other to fulfill performance of the long-standing operation of playback music 122 (e.g., Track #1) from the user's playlist.

In some examples, in response to the first AED 104a detecting the group hotword 50g in the audio data 20, the first AED 104a invokes each other AED 104 in the selected group of AEDs 104 that did not detect the group hotword 50g to wake-up from the low-power state and collaborate with the first AED 104a to fulfill performance of the operation specified by the query 128. In these examples, responsive to detecting the group hotword 50g, the first AED 104a may identify each of the one or more other AEDs 104 in the selected group assigned the group hotword by accessing the hotword registry 500. Here, the hotword registry 500 containing the list of one or more hotwords includes the group hotword 50g "downstairs stairs" assigned to the first AED 104a named Device 1 and the second AED 104b named Device 2. Thus, the first AED 104a may identify that the second AED 104b named Device 2 is also assigned the group hotword 50g to thereby invoke the second AED 104b to collaborate with the first AED 104a to fulfill performance of the operation (e.g., streaming music 122 from the user's 102 playlist) specified by the query 128.

While the query 128 in the example shown specifies a long-standing operation to perform, other examples may include a query specifying a device-level operation to perform on each AED in the selected group of AEDs individually. That is, during execution of the collaboration routine

150, each AED in the selected group of AEDs collaborate by fulfilling performance of the device-level operation independently. For instance, if the first and second AEDs 104*a*, 104*b* corresponded to smart lightbulbs assigned the same group hotword 50*g*, a query specifying a device-level operation to turn off lights would cause each smart lightbulb to perform the operation of power off independently.

Figure 2A:
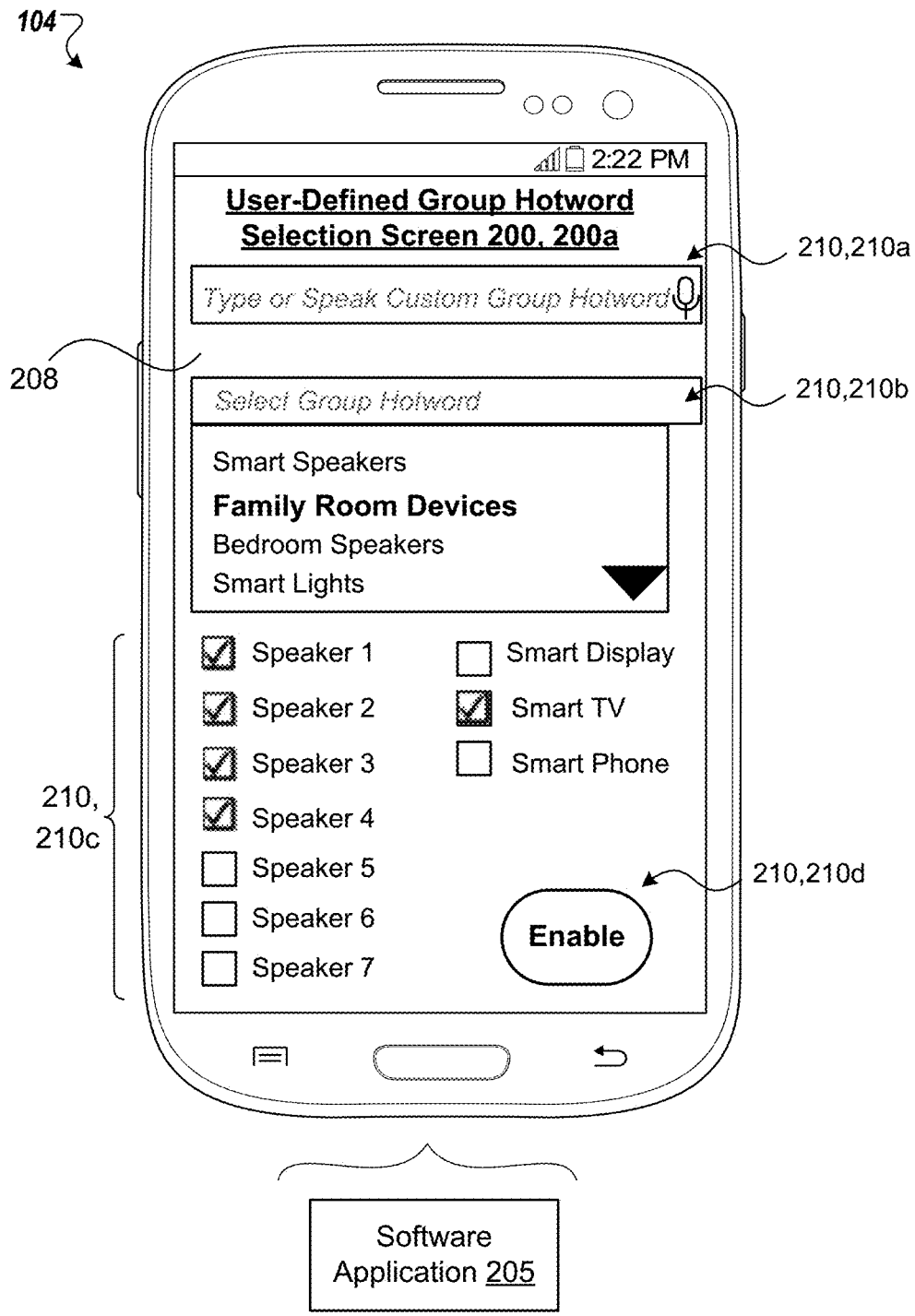
FIGS. 2A and 2B are schematic views of example graphical user interfaces for enabling and assigning group hotwords to different selected groups of assistant-enabled devices.

Referring to FIG. 2A, in some implementations, a software application 205 associated with the digital assistant 105 executes on a user device to display a user-defined group hotword selection screen 200, 200*a* in a graphical user interface (GUI) 208 of the user device. In the example shown, the user device includes an AED 104 corresponding to a smart phone (e.g., smart phone 104*j* of FIG. 4). The user-defined group hotword selection screen 200*a* permits the user to enable and assign a group hotword 50*g* to a group of two or more AEDs 104 selected by the user. The user 102 may use the group hotword selection screen 200*a* to enable and assign group hotwords in addition to, or lieu of, providing voice inputs as described above with reference to FIGS. 1A-1C. In the example shown, the group hotword selection screen 200*a* displays a plurality of objects 210, 210*a-d* in the GUI 208 that the user may interact with to instruct the digital assistant 105 to enable a group hotword 50*g* and select the group of AEDs 104 to be assigned the group hotword 50*g*.

The GUI 208 may receive a user input indication indicating user interaction with a text field object 210*a* that allows the user to create a custom group hotword by typing a name of the custom group hotword the user wants to create. Optionally, the user 102 may select a voice input graphic (e.g., graphical microphone) to provide a voice input corresponding to the user 102 speaking the custom group hotword. When creating a custom group hotword, the group hotword selection screen 200*a* may prompt the user to speak a number of training examples that include the custom group hotword for use in training a group hotword detection model 114 to detect the custom group hotword in streaming audio.

On the other hand, the user 102 may enable a predefined group hotword by providing a user input indication indicating user interaction with a dropdown object 210*b* that presents a list of available predefined group hotwords to select from. The dropdown object 210 may present commonly used group hotwords as available predefined group hotwords to select from such as group hotwords descriptive of device type, e.g., "Smart Speakers" and "Smart Lights", descriptive of common zones/areas in an environment, e.g. "Family Room Devices", and descriptive of both device type and zone/area, e.g., "Bedroom Speakers". The user can interact with the dropdown object 210*b* to scroll through the list of available group hotwords. In some examples, custom group hotwords can be added to the list of available group hotwords. In the example shown, the GUI 208 receives a user input indication indicating user interaction with the dropdown object 210 to select the predefined group hotword "Family Room Devices" from the list of available predefined group hotwords. Here, the selection of the predefined group hotword may instruct the digital assistant 105 to enable the predefined group hotword. The assistant may also suggest group hotwords to enable/activate for assignment to groups of AEDs 104. For instance, a user may tend to query a group of devices manually I (e.g., in a sequence or via their individual names) which all belong to a semantic group.

Further, the group hotword selection screen 200*a* displays a plurality of selection objects 210*c* each corresponding to a respective one of a plurality of AEDs 104 associated with the user 102. The user 102 may provide user input (e.g., touch) to select each AED 104 to include in a group of AEDs 104 to be assigned the group hotword 50*g* created via the text field object 210*a* or selected from the dropdown object 210*b*. In the example shown, the GUI 208 receives user input indications indicating user interaction with selection objects 210*c* corresponding to the AEDs 104 named Speaker 1, Speaker 2, Speaker 3, Speaker 4, and Smart TV to include these AEDS in the selected group of AEDs to be assigned the group hotword "Family Room Devices". To instruct the digital assistant 105 to enable and assign the group hotword "Family Room Devices" to the selected group of AEDs 104 that includes Speakers 1-4 and Smart TV, the user 102 may provide a user input indication indicating user interaction with an enable object 210*d*. Assuming the enable object 210*d* is selected, the digital assistant 105 will provide assignment instructions to the selected group of AEDs that includes Speakers 1-4 and Smart TV indicating assignment of the group hotword "Family Room Speakers" to the selected group of AEDs. The digital assistant may also add the group hotword and selected group of AEDs to the hotword registry 500 as shown in FIG. 5.

Figure 2B:
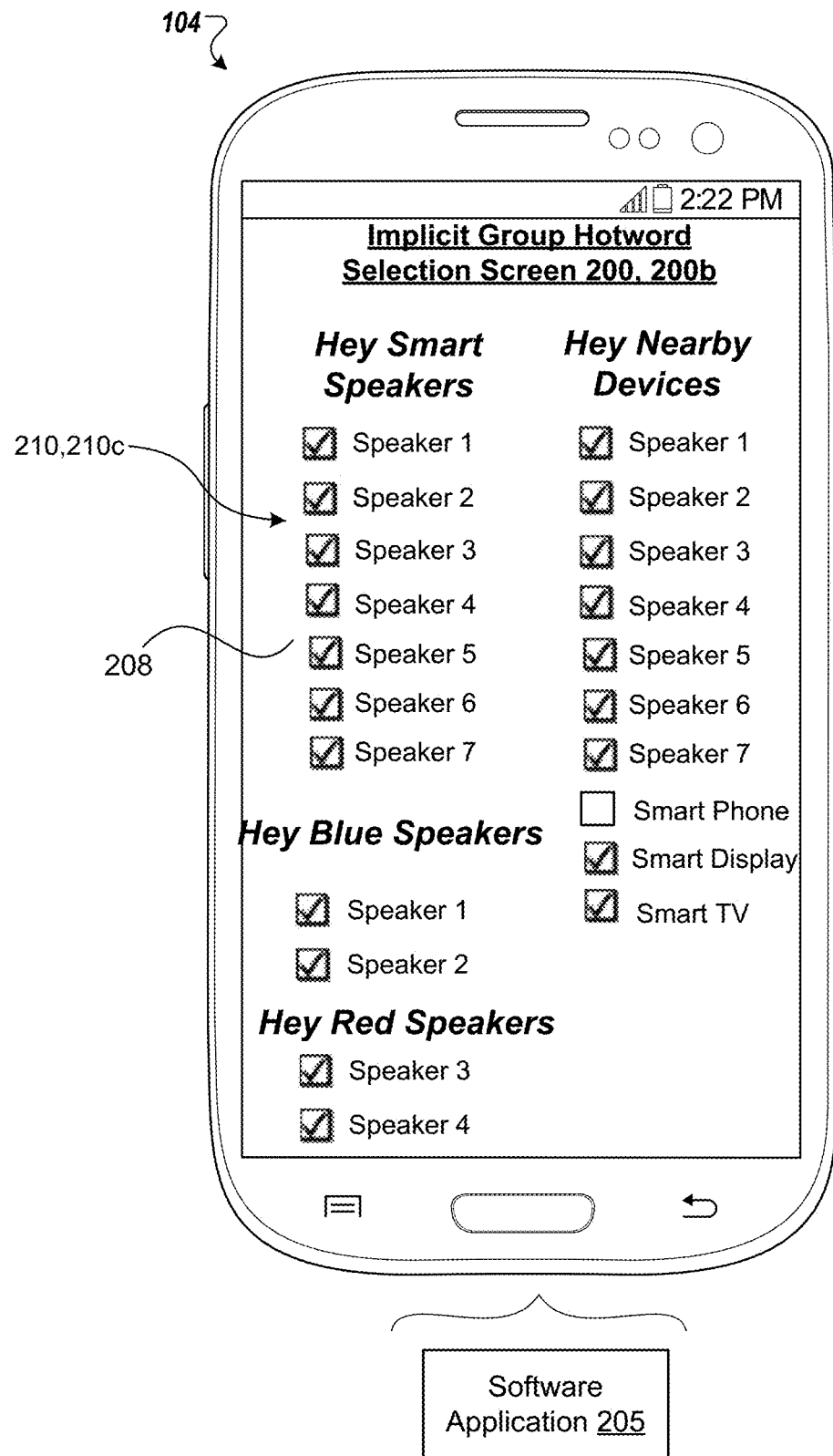

Referring to FIG. 2B, in some implementations, the software application 205 associated with the digital assistant 105 is configured to display an implicit group hotword selection screen 200, 200*b* in the GUI 208 of the AED 104. The implicit group hotword selection screen 200*b* displays a plurality of available implicit group hotwords and allows the user 102 to select groups of AEDs to be assigned to each implicit group hotword. For each implicit group hotword, the implicit group hotword selection screen 200*b* may list all eligible AEDs that can be assigned the implicit group hotword based on attributes associated with the AEDs. For instance, all of the AEDs 104 associated with the user 102 are listed as eligible AEDs to be assigned the proximity-based group hotwords "Hey nearby devices" and/or "Hey nearby device". Accordingly, the user 102 may address, in a single query, one or more AEDs that are closest to the user 102 at any given time by simply speaking the proximity-based group hotword "Hey nearby devices" or "Hey nearby device" such that AEDs detecting the spoken group hotword will collaborate with one another by performing arbitration to select the device or devices which are closest to the user 102 for fulfilling an operation specified by the query. Advantageously, the proximity-based group hotword allows the user 102 to address only a subset of one or more AEDs that are currently closest in proximity to the user 102 without requiring the user to explicitly identify any particular AED in the subset of the one or more AEDs In the example shown, the proximity-based group hotword "Hey nearby devices" is assigned to all AEDs associated with the user by default. The user may interact with selection objects to remove any AEDs from the selected group of AEDs assigned the proximity-based group hotword. For instance, the GUI 208 may receive a user input indications indicating user interaction with a selection object 210*c* corresponding to the AED 104 named Smart Phone to remove the Smart Phone from the group assigned the proximity-based group hotword. Accordingly, the smart phone will not detect or respond to the user speaking "Hey Nearby Devices" even if the smart phone is the closest AED relative to the user 102.

Other implicit group hotwords include device-type group hotwords that can be assigned to a selected group of AEDs that all share a same device type. In the example shown, the implicit group hotword selection screen 200*b* lists only Speakers 1-7 as eligible AEDs to be assigned the implicit device-type group hotword "Hey smart speakers" since the AEDs named Speakers 1-7 all include the same device type of smart speaker. Accordingly, the user 102 may interact with the selection objects 210*c* displayed in the GUI 208 to select the group of AEDs (or unselect AEDs from the group) to be assigned the group hotword "Hey smart speakers" and subsequently speak utterances that include the group hotword "Hey smart speakers" to address all the AEDs associated with the user 102 that include the device type of smart speakers in a single query.

The implicit group hotword selection screen 200*b* also displays two different implicit attribute-based hotwords that may each be assigned to a respective selected group of AEDs 104 that share a common attribute. For instance, a first attribute-based group hotword includes "Blue Speakers" that the user 102 may assign to Speaker 1 and Speaker 2 to allow the user to address all the smart speakers that share the attribute of having a blue color (or are otherwise labeled as "Blue") in a single query. Similarly, a second attribute-based group hotword includes "Red Speakers" that the user may assign to Speaker 3 and Speaker 4 to allow the user to address all the smart speakers that share the attribute of having a red color (or are otherwise labeled as "Red") in a single query. As will become apparent with reference to FIG. 4 below, attribute-based group hotwords can further narrow down a specific group of AEDs a user wants to address.

Figure 4:
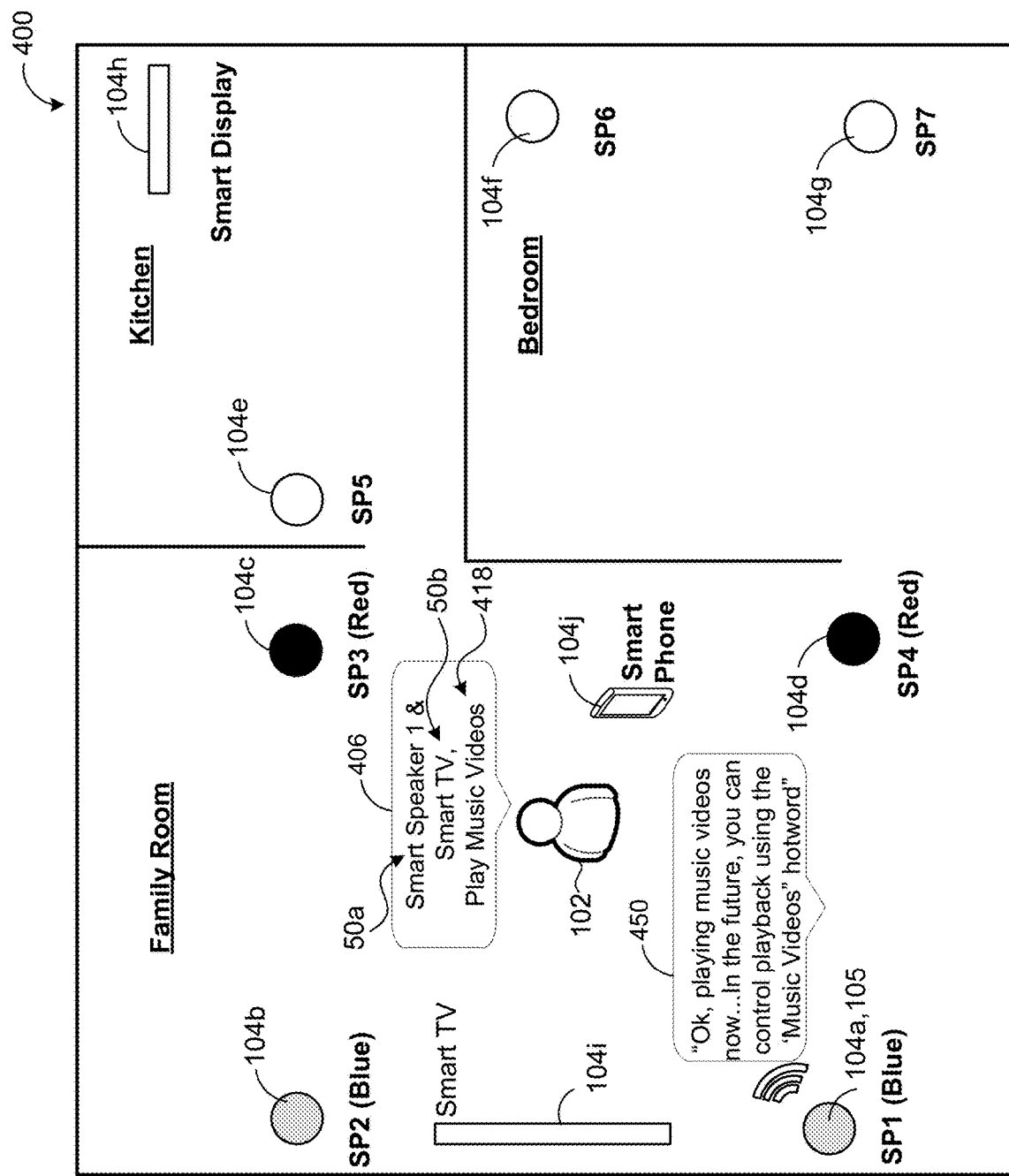
FIG. 4 is a schematic view of an example speech-enabled environment including a plurality of assistant-enabled devices located in different zones of the environment.

FIG. 4 shows an example speech-enabled environment 400 including a plurality of AEDs 104 associated with a user 102. In the example shown, the speech-enabled environment 400 is a home of the user 102 having multiple rooms and zones including a family room, a kitchen, and a bedroom. While the speech-enabled environment 400 depicts a home in FIG. 4, the speech-enabled environment 400 can include any environment implementing a network of multiple AEDs such as educational environments, businesses, or automobiles.

The AEDs 104 include seven smart speakers 104*a*-*g* (SPs 1-7), a smart display 104*h*, a smart TV 104*i*, and a smart phone 104*j* positioned throughout the speech-enabled environment. Smart speakers SP1 104*a*, SP2 104*b*, SP3 104*c*, SP4 104*d* and the smart TV 104*i* are positioned in the family room of the speech-enabled environment 400, in addition to the smart phone 104*j* which is portable/mobile and may be moved throughout the various rooms/zones in the speech-enabled environment 400. The smart speakers SP1-SP4 and the smart TV 104*i* may bond or otherwise pair together to form a respective zoned named "Family Room". Further, the first and second smart speakers SP1, SP2 may be labeled as "Blue" devices to describe their physical attribute of being the color blue and the third and fourth smart speakers SP3, SP4 may be labeled as "Red" devices to describe their attribute of being the color red. Other attributes may be used such as size (e.g., big vs. small), type/brand (e.g., highfidelity speakers), or any other label that the user use to identify/group AEDs within a specific zone or across multiple zones in the speech-enabled environment 400. The speech-enabled environment 400 also depicts the smart speaker SP5 104*e* and the smart display 104*h* positioned in the kitchen and bonding/pairing with one another to form a respective zone named "Kitchen". Likewise, the smart speakers SP6 104*f* and SP7 104*g* may bond/pair together to form a respective zone named "Bedroom".

Described with reference to the speech-enabled environment 400 of FIG. 4, FIG. 5 shows an example hotword registry 500 containing a list of hotwords 50 each assigned to a respective selected group of the AEDs 104 located in the speech-enabled environment 400. One or more of the AEDs 104 may each store the hotword registry 500 on respective local memory hardware 12. AEDs 104 that do not store the hotword registry 500 may discover other AEDs 104 in the network and access the hotword registry 500 there on to ascertain which hotwords are assigned to which AEDs. Additionally or alternatively, the hotword registry 500 may be stored on a centralized device and in communication with one or more of the AEDs. For instance, the hotword registry 500 may be stored on a remote server, such as a remote server affiliated with the digital assistant 105 that associates the hotword registry with a profile for the user 102.

Each of the AEDs 104 is assigned a default hotword 50 "Hey Assistant" that when detected in streaming audio by one or more of the AEDs triggers the AEDs 104 to wake-up from a low-power state and invoke a first digital assistant 105 to initiate processing of one or more other terms following the default hotword 50. Here, the first digital assistant may be affiliated with a first voice assistant service (e.g., GOOGLE'S Assistant). Moreover, smart speaker SP2 104*b*, the smart display 104*h*, and the smart phone 104*j* are also assigned another default hotword "Other Assistant" that when detected in streaming audio by any one of the AEDs 104*b*, 104*h*, 104*j* triggers that AED to invoke a second digital assistant to initiate processing of one or more other terms following the other default hotword. Here, the second digital assistant may be affiliated with a second voice assistant service (e.g., AMAZON'S Alexa or APPLE'S Siri) different than the first voice assistant service. Additionally, each AED 104 may be assigned a unique device-specific hotword that only the corresponding AED is configured to detect in streaming audio when the user only wants to address the corresponding AED. For instance, a unique device-specific hotword assigned to the first smart speaker SP1 104*a* in the environment 400 may include an identifier of the AED such as "Hey Device 1" or simply "Device 1", or could include a device type and/or other attribute associated with the AED such as "Hey Smart Speaker 1" or simply "Smart Speaker 1".

As mentioned previously, group hotwords assigned to respective selected groups of AEDs may include manuallyenabled hotwords 50 assigned by the user 102 to the respective selected group of AEDs 104. The manuallyenabled hotwords may be custom hotwords created by the user 102 and/or predefined hotwords available for selection by the user 102. The predefined hotwords may be associated with pre-defined hotword models trained to detect the associated hotword. A custom hotword created by the user 102, however, may require the user to train a custom hotword detection model to detect the custom hotword. For instance, the user 102 may speak one or more utterances that include the custom hotword.

In some examples, the user 102 provides a voice input (e.g., utterance) 106 (FIG. 1A) to select each AED the user wants to include in a selected group of AEDs and assigns a manually-enabled group hotword 50*g* the selected group of AEDs 104. Similarly, the user may provide subsequent voice inputs 136, 146 (FIGS. 1B and 1C) to update the selected group of AEDs 104 by adding one or more additional AEDs to an existing selected group of AEDs (FIG. 1B) and/or removing one or more AEDs from the existing selected group of AEDs (FIG. 1C). Additionally or alternatively, the user may provide user input indications indicating user interaction with one or more objects displayed in a GUI 208, such as the user-defined group hotword selection screen 200*a* of FIG. 2A, to instruct the digital assistant 105 to enable the manual group hotword and select the group of AEDs to be assigned the group hotword. The user 102 may provide subsequent user interaction indications to the GUI 208 to update the selected group of AEDs 104 by adding additional AEDs and/or removing AEDs from the existing selected group.

In the example hotword registry 500 for the speech-enabled environment 400, the user 102 enables and assigns the manual group hotword "Family Room Devices" to the respective selected group of AEDs that includes smart speakers SP1-SP4 104a-d and the smart TV 104i located in the zone named "Family Room". The user 102 also enables and assigns the manual group hotword "Kitchen Devices" to the smart speaker SP5 104e and the smart display 104h located in the zone named "Kitchen". Likewise, the manual group hotword "Bedroom Speakers" is enabled and assigned by the user to the smart speakers SP6, SP7 104f-g located in the zone named "Bedroom". Here, each manually-enabled group hotword may be descriptive of a location/zone within the speech-enabled environment 400 (e.g., the user's home) at which the respective selected group of AEDs assigned the corresponding group hotword 50 are located. Notably, the manual-enabled group hotword "Bedroom Speakers" assigned to smart speakers SP6, SP7 is descriptive of the device type (e.g., smart speakers) associated with the respective selected group of AEDs.

In the example shown, the user 102 has not assigned any manually-enabled group hotword to the smart phone 104j. However, one or more of the selected group of AEDs may be updated to add/include the smart phone 104j to enable the smart phone 104j to collaborate with the other AEDs in the respective group to fulfill an operation specified by a query when the corresponding group hotword preceding the query is detected in streaming audio.

The example hotword registry 500 of FIG. 5 also shows that a plurality of different implicit group hotwords 50g are each assigned to a different respective selected group of AEDs 104. As described above with reference to FIG. 2B, a software application 205 associated with the digital assistant 105 may render the implicit group hotword selection screen 200b in the GUI 208 and the user 102 may interact with the screen 200b to view the available implicit group hotwords and select groups of AEDs to be assigned to the implicit group hotwords. For instance, the proximity-based group hotwords "Hey nearby devices" and/or "Hey nearby device" are assigned to all of the AEDs 104a-j associated with the user 102 that are located in the speech-enabled environment 400 of FIG. 4. Accordingly, the user 102 may address, in a single query, one or more AEDs that are closest to the user 102 in the speech-enabled environment 400 at any given time by simply speaking the proximity-based group hotword "Hey nearby devices" or "Hey nearby device" such that AEDs detecting the spoken group hotword will collaborate with one another by performing arbitration to select the device or devices are closest to the user 102 for fulfilling an operation specified by the query. Advantageously, the proximity-based group hotword allows the user 102 to address only a subset of one or more AEDs that are currently closest in proximity to the user 102 without requiring the user to explicitly identify any particular AED in the subset of the one or more AEDs.

Each AED 104 assigned the implicit proximity-based group hotword may run a hotword detection model to detect the presence of the group hotword in streaming audio to trigger the wake-up process and initiate speech recognition on the audio. As the implicit group hotword in this instance is proximity-based, even though multiple AEDs 104 may detect the group hotword in captured streaming audio, these AEDs 104 may each subsequently process the audio to determine a respective proximity value relative to the user 102 and then perform arbitration using these proximity values across the multiple AEDs 104 to elect one or more of these AEDs 104 to fulfill an operation specified by the user's query. Here, AEDs 104 outside some upper distance threshold from the user may be ineligible to fulfill the query. Optionally, AEDs 104 inside some lower distance threshold, such as a smart phone AED in the user's pocket that detected the proximity based group hotword "Hey nearby device(s)", may also be ineligible to respond to the query. The lower distance threshold could be applied depending on the type of query. For example, if the query is a search query in which the nearby device provides is to provide a search result as synthesized speech, then the fact that the smart phone 104j is so close to the user 102 to indicate the smart phone 104j is in the user's pocket, would disqualify the smart phone 104j from fulfilling the query since the synthesized speech would be muffled and not understood/heard by the user 102. The user also has the option to add/remove AEDs from the selected group assigned the proximity-based group hotword. Additionally, the selected device nearest the user 102 may perform speech recognition and query interpretation to determine whether "nearby device" was spoken by user 102 to indicate that the user 102 only wants a single device nearest the user to fulfill a query, or whether "nearby devices" was spoken to indicate that the user wants two or more nearby devices to fulfill the query.

Moreover, the example hotword registry 500 of FIG. 5 also shows two different implicit device-type group hotwords each assigned to a respective selected group of AEDs 104 in the speech-enabled environment 400 that are associated with a same respective device type. For instance, a first device-type group hotword includes "Smart Speakers" assigned to all the smart speakers SP1-SP7 in the speech-enabled environment 400 to allow the user to address all the AEDs 104a-h associated with the user 102 that include the device type of smart speakers in a single query. Here, the device-type group hotword "Smart Speakers" addresses the four smart speakers SP1-SP4 located in the zone named "Family Room", the smart speaker SP5 located in the zone named "Kitchen", and the smart speakers SP6, SP7 located in the zone named "Bedroom". Notably, the manually-enabled group hotword "Family Room Devices" is also assigned to the smart speakers SP1-SP4, the manually-enabled group hotword "Kitchen Devices" is also assigned to the smart speaker SP5, and the manually-enabled group hotword "Bedroom Speakers" is also assigned to the smart speakers SP5, SP7.

Additionally, a second device-type group hotword includes "Smart Displays" assigned to the respective selected group of AEDs that include the smart display 104h located in the zone named "Kitchen" and the smart TV 104i located in the zone named "Family Room". Notably, the manually-enabled group hotword "Family Room Devices" is also assigned to the smart TV 104i and the manually-enabled group hotword "Kitchen Devices" is also assigned to the smart display 104h.

With continued reference to the speech-enabled environment 400 of FIG. 4 and the example hotword registry 500 of FIG. 5, two different implicit attribute-based hotwords are each assigned to a respective selected group of AEDs 104 in the speech-enabled environment 400 that share a common attribute. For instance, a first attribute-based group hotword includes "Blue Speakers" assigned to the first and second smart speakers SP1, SP2 located in the zone named "Family Room" of the environment 400 to allow the user to address all the smart speakers 104a-b that share the attribute of having a blue color (or are otherwise labeled as "Blue") in a single query. Similarly, a second attribute-based group hotword includes "Red Speakers" assigned to all the smart speakers 104c-d that share the attribute of having a red color (or are otherwise labeled as "Red") in a single query. Notably, the first and second smart speakers SP1, SP2 assigned the group hotword "Blue Speakers" and the third and fourth smart speakers SP3, SP4 assigned the group hotword "Red Speakers" are also in the selected group of seven (7) smart speakers 104a-g assigned the device-type group hotword "Smart Speakers" as well as the selected group of five (5) AEDs 104a-d, 104i assigned the manually-enabled group hotword "Family Room Devices" that include the smart speakers SP1-4 and the smart TV 104i. Thus, attribute-based group hotwords can further narrow down a specific group of AEDs a user wants to address.

Referring to FIG. 4, in one example, the user 102 located in the zone named Family Room of the speech-enabled environment 400 speaks the utterance 406 "Speaker 1 & Smart TV, Play music videos" corresponding to a command 418 for the digital assistant 105 to perform a long-standing action of streaming music videos for playback on the first smart speaker SP1 104a and the smart TV 104i. The digital assistant 105 may execute across all of the AEDs 104 in the speech-enabled environment 400. The terms "Speaker 1" and "Smart TV" prefix the command 418 and correspond to the respective device-specific hotword 50a assigned to the first smart speaker SP1 104a and the respective device-specific hotword 50b assigned to the "Smart TV". Here, the first smart speaker SP1 104a executes a hotword detection model trained to detect the hotword 50a "Speaker 1" in audio data corresponding to the utterance 14 to trigger the SP1 104a to wake-up from a low-power state and initiate processing on the audio data. At the same time, the smart TV 104i executes a hotword detection model trained to detect the hotword 50b "Smart TV" in the audio data corresponding to the utterance 14 to trigger the smart TV 104i to wake-up from a low-power state and initiate processing on the audio data. After processing the audio data by performing speech recognition to generate an ASR result and performing query interpretation on the ASR result to identify the command 418 to perform the long-standing action on the first smart speaker SP1 104a and the smart TV 104i, the SP1 and the smart TV collaborate with one another to fulfill the long-standing action. For instance, the smart TV 104i may stream video data to display a video portion of the music videos while the SP1 may stream audio data to audibly output an audio portion of the music videos.

Continuing with the example, the digital assistant 105 is also configured to automatically create an action-specific group hotword and assign the action-specific group hotword to the selected group of AEDs that includes the first smart speaker SP1 104a and the smart TV 104i performing the long-standing action while the long-standing action is in progress. The user 102 may use the action-specific group hotword in follow-up queries that pertain to the long-standing action of playing back the music videos on the first smart speaker SP1 104a and the smart TV 104i. Accordingly, the AEDs corresponding to the first smart speaker SP1 104a and the smart TV 104i each receive an assignment instruction assigning the action-specific group hotword "Music Videos" that was automatically created by the digital assistant 105. Thereafter, the user 102 may address the long-standing action performed on the first smart speaker SP1 104a and the smart TV 104i by simply speaking the phrase "Music Videos" followed by a query/command for controlling the long-standing action. For instance, the user 102 may speak "Music Videos, next song" or "Music Videos, turn up the volume" to advance to a next music video or instruct the first smart speaker SP1 to increase the volume. In response to creating the action-specific group hotword and providing the assignment instructions to the first smart speaker SP1 104a and the smart TV 104i, the digital assistant 105 may update the hotword registry 500 of FIG. 5 to indicate that the action-specific group hotword "Music Videos" is assigned to the selected group of AEDs that includes the first smart speaker SP1 104a and the smart TV 104i.

In some examples, the first smart speaker SP1 104a outputs, for audible playback, synthesized speech corresponding to a response from the digital assistant 105 to indicate performance of the long-standing action is in progress and the automatically created action-specific group hotword for use in follow-up queries that pertain to the long-standing action. For instance, FIG. 4 shows the SP1 104a outputting synthesized speech corresponding to a response 450 from the digital assistant 105 that includes, "Ok, playing music videos now . . . . In the future, you can control playback using the 'Music Videos' hotword". The digital assistant 105 is configured to revoke the use of the action-specific group hotword pertaining to the long-standing action when the long-standing action ends. Thus, when the long-standing action ends, the digital assistant 105 may update the hotword registry 500 to remove the action-specific hotword and inform the selected group of AEDs to no longer respond to the action-specific group hotword. The user 102 may reject the use of the action-specific group hotword at any time by providing a voice input or through the GUI of FIGS. 2A and 2B.

Figure 6:
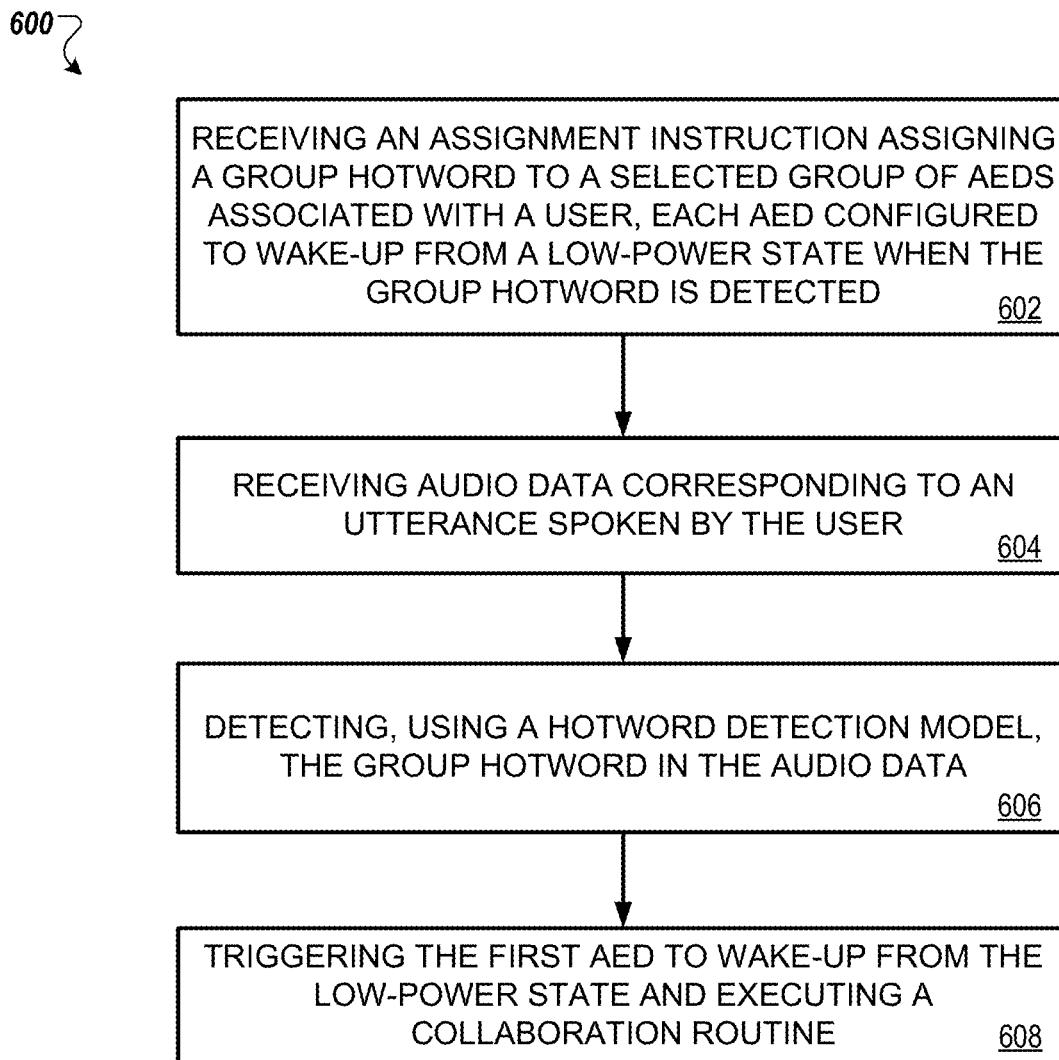
FIG. 6 is a flowchart of an example arrangement of operations for a method of enabling and assigning a group hotword to a selected group of assistant-enabled devices.

FIG. 6 is a flowchart of an exemplary arrangement of operations for a method 600 of enabling and assigning group hotwords to selected groups of assistant-enabled devices (AEDs) 104. At operation 602, the method 600 includes receiving, at data processing hardware 10 of a first AED 104a, an assignment instruction assigning a group hotword 50g to a selected group of AEDs 104 associated with a user. The selected group of AEDs 104 includes the first AED 104a and one or more other AEDs 104b-n. Each AED in the selected group of AEDs is configured to wake-up from a low-power state when the group hotword 50g is detected in streaming audio by at least one of the AEDs in the selected group of AEDs.

At operation 604, the method 600 includes receiving, at the data processing hardware 10, audio data 20 that corresponds to an utterance 126 spoken by the user 102. The audio data 20 includes a query 128 that specifies an operation to perform. At operation 606, the method 600 includes detecting, by the data processing hardware 10, using a hotword detection model 114, the group hotword 50g in the audio data 20.

At operation 608, in response to detecting the group hotword 50g in the audio data 20, the method 600 includes triggering, by the data processing hardware 10, the first AED 104a to wake-up from the low-power state and executing, by the data processing hardware 10, a collaboration routine 150 that to cause the first AED 104a and each other AED 104 in the selected group of AEDs to collaborate with one another to fulfill performance of the operation specified by the query 128.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
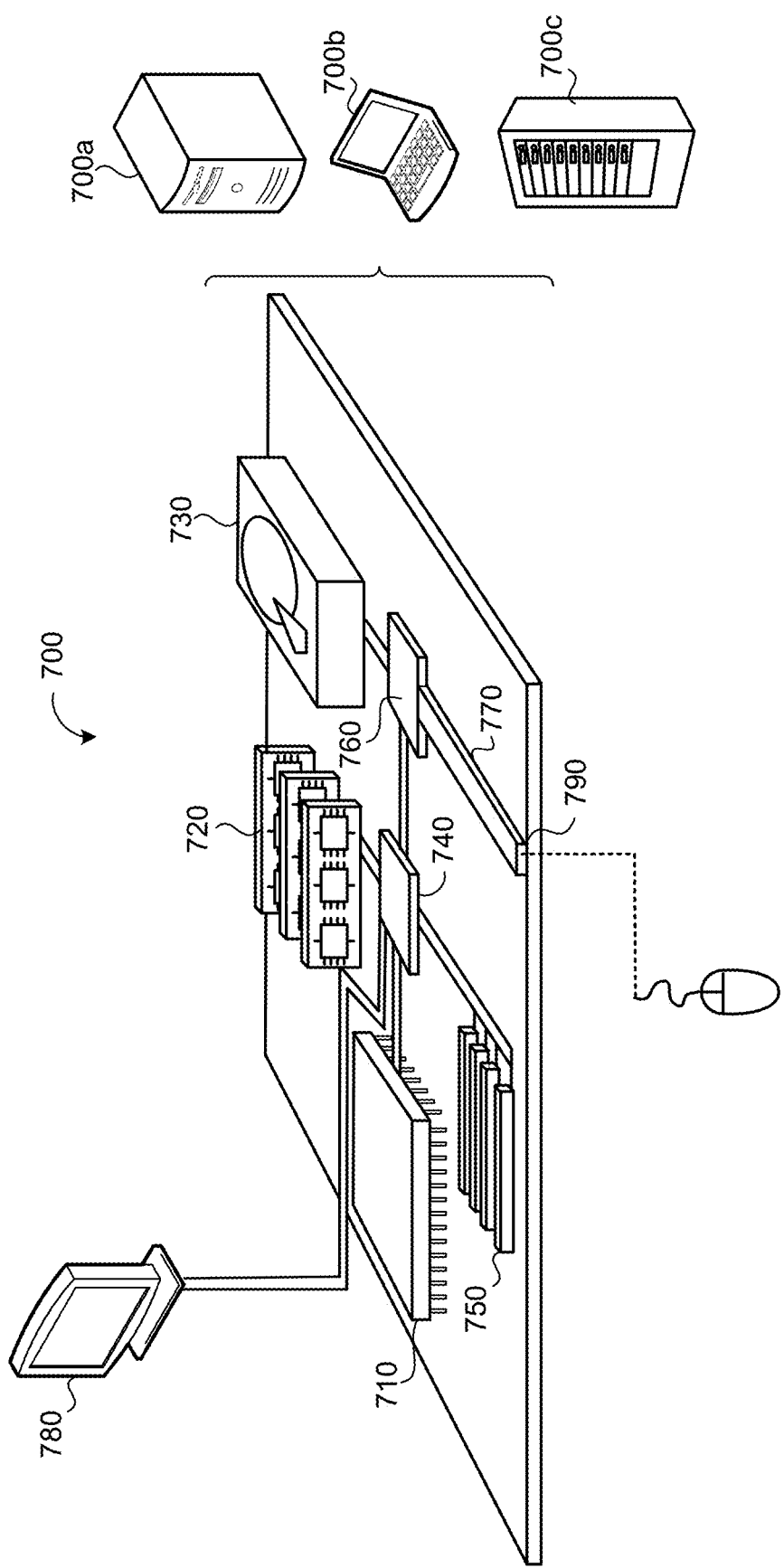
FIG. 7 is an example computing device.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware of a first assistant-enabled device (AED) that causes the data processing hardware to perform operations comprising:
   receiving a voice input from the user requesting a digital assistant to enable a group hotword and assign the group hotword to a selected group of AEDs associated with a user, the selected group of AEDs comprising the first AED and one or more other AEDs;
   performing, using a speech recognizer, speech recognition on the voice input to generate an automated speech recognition (ASR) result for the voice input;
   performing query interpretation on the ASR result for the voice input to identify a group hotword query that specifies a name of the group hotword to enable and each AED in the selected group of AEDs to be assigned the group hotword; and
   based on the query interpretation performed on the ASR result for the voice input, assigning the group hotword to the selected group of AEDs, each AED in the selected group of AEDs configured to wake-up from a low-power state when the group hotword is detected in streaming audio by at least one of the AEDs in the selected group of AEDs.

2. The method of claim 1, wherein the operations further comprise:
   receiving audio data corresponding to an utterance spoken by the user, the audio data comprising a query specifying an operation to perform;
   detecting, using a hotword detection model, the group hotword in the audio data; and
   in response to detecting the group hotword in the audio data:
     triggering the first AED to wake-up from the low-power state; and
     executing a collaboration routine to cause the first AED and each other AED in the selected group of AEDs to collaborate with one another to fulfill performance of the operation specified by the query.

3. The method of claim 2, wherein:
   the query specifying the operation to perform comprises a query for the selected group of AEDs to perform a long-standing operation; and
   during execution of the collaboration routine, each AED in the selected group of AEDs collaborate with one another by:
     pairing with one another for a duration of the long-standing operation; and
     coordinating performance of sub-actions related to the long-standing operation.

4. The method of claim 2, wherein:
   the operation specified by the query comprises a device-level operation to perform on each AED in the selected group of AEDs; and
   during execution of the collaboration routine, each AED in the selected group of AEDs collaborate with one another by fulfilling performance of the device-level operation independently.

5. The method of claim 2, wherein:
   the group hotword assigned to the selected group of AEDs comprises a proximity-based hotword addressing only a subset of one or more AEDs from the selected group of AEDs that are currently closest in proximity to the user without explicitly identifying any particular AED in the subset of the one or more AEDs;
   the hotword detection model is pre-trained to detect the presence of the group hotword in streaming audio without performing speech recognition on the audio data; and
   executing the collaboration routine causes the first AED and each other AED in the selected group of AEDs to each determine a respective proximity value relative to the user and perform arbitration using the respective proximity values across the selected group of AEDs to elect the subset of the one or more AEDs to fulfill performance of the operation specified by the query.

6. The method of claim 1, wherein the operations further comprise, after receiving the voice input from the user requesting the digital assistant to enable the group hotword and assign the group hotword to the selected group of AEDs:
  executing a leader election process to elect, based on respective device properties associated with each AED in the selected group of AEDs, one or more AEDs from the selected group of AEDs to listen for the presence of the group hotword in the streaming audio on behalf of the selected group of AEDs,
  wherein at least the first AED in the selected group of AEDs is elected by the leader election process to listen for the presence of the group hotword in the streaming audio.

7. The method of claim 6, wherein the operations further comprise, re-executing the leader election process in response to an update to the selected group of AEDs assigned the group hotword adds one or more additional AEDs to the selected group of AEDs and/or removes one or more of the AEDs from the selected group of AEDs.

8. The method of claim 6, wherein the operations further comprise, re-executing the leader election process in response to an occurrence of a device state change at one of the AEDs in the selected group of AEDs.

9. The method of claim 6, wherein the respective device properties associated with each AED in the selected group of AEDs comprises at least one of processing capabilities, device type, user-configurable device settings, power usage, battery level, physical location of the AED, or network capabilities.

10. The method of claim 1, wherein the group hotword comprises one of:
  a custom hotword created by the user; or
  a predefined hotword selected from a list of one or more available group hotwords.

11. A first assistant-enabled device (AED) comprising:
  data processing hardware; and
  memory hardware in communication with the data processing hardware, the memory hardware storing instructions that when executed on the data processing hardware cause the data processing hardware to perform operations comprising:
    receiving a voice input from the user requesting a digital assistant to enable a group hotword and assign the group hotword to a selected group of AEDs associated with a user, the selected group of AEDs comprising the first AED and one or more other AEDs;
    performing, using a speech recognizer, speech recognition on the voice input to generate an automated speech recognition (ASR) result for the voice input;
    performing query interpretation on the ASR result for the voice input to identify a group hotword query that specifies a name of the group hotword to enable and each AED in the selected group of AEDs to be assigned the group hotword; and
    based on the query interpretation performed on the ASR result for the voice input, assigning the group hotword to the selected group of AEDs, each AED in the selected group of AEDs configured to wake-up from a low-power state when the group hotword is detected in streaming audio by at least one of the AEDs in the selected group of AEDs.

12. The first AED of claim 11, wherein the operations further comprise:
  receiving audio data corresponding to an utterance spoken by the user, the audio data comprising a query specifying an operation to perform;
  detecting, using a hotword detection model, the group hotword in the audio data; and
  in response to detecting the group hotword in the audio data:
    triggering the first AED to wake-up from the low-power state; and
    executing a collaboration routine to cause the first AED and each other AED in the selected group of AEDs to collaborate with one another to fulfill performance of the operation specified by the query.

13. The first AED of claim 12, wherein:
  the query specifying the operation to perform comprises a query for the selected group of AEDs to perform a long-standing operation; and
  during execution of the collaboration routine, each AED in the selected group of AEDs collaborate with one another by:
    pairing with one another for a duration of the long-standing operation; and
    coordinating performance of sub-actions related to the long-standing operation.

14. The first AED of claim 12, wherein:
  the operation specified by the query comprises a device-level operation to perform on each AED in the selected group of AEDs; and
  during execution of the collaboration routine, each AED in the selected group of AEDs collaborate with one another by fulfilling performance of the device-level operation independently.

15. The first AED of claim 12, wherein:
  the group hotword assigned to the selected group of AEDs comprises a proximity-based hotword addressing only a subset of one or more AEDs from the selected group of AEDs that are currently closest in proximity to the user without explicitly identifying any particular AED in the subset of the one or more AEDs;
  the hotword detection model is pre-trained to detect the presence of the group hotword in streaming audio without performing speech recognition on the audio data; and
  executing the collaboration routine causes the first AED and each other AED in the selected group of AEDs to each determine a respective proximity value relative to the user and perform arbitration using the respective proximity values across the selected group of AEDs to elect the subset of the one or more AEDs to fulfill performance of the operation specified by the query.

16. The first AED of claim 11, wherein the operations further comprise, after receiving the voice input from the user requesting the digital assistant to enable the group hotword and assign the group hotword to the selected group of AEDs:
  executing a leader election process to elect, based on respective device properties associated with each AED in the selected group of AEDs, one or more AEDs from the selected group of AEDs to listen for the presence of the group hotword in the streaming audio on behalf of the selected group of AEDs,
  wherein at least the first AED in the selected group of AEDs is elected by the leader election process to listen for the presence of the group hotword in the streaming audio.

17. The first AED of claim 16, wherein the operations further comprise, re-executing the leader election process in response to an update to the selected group of AEDs assigned the group hotword adds one or more additional AEDs to the selected group of AEDs and/or removes one or more of the AEDs from the selected group of AEDs.

18. The first AED of claim 16, wherein the operations further comprise, re-executing the leader election process in response to an occurrence of a device state change at one of the AEDs in the selected group of AEDs.

19. The first AED of claim 16, wherein the respective device properties associated with each AED in the selected group of AEDs comprises at least one of processing capabilities, device type, user-configurable device settings, power usage, battery level, physical location of the AED, or network capabilities.

20. The first AED of claim 11, wherein the group hotword comprises one of:
   a custom hotword created by the user; or
   a predefined hotword selected from a list of one or more available group hotwords.

* * * * *